(12) United States Patent
Canale

(10) Patent No.: US 12,439,914 B2
(45) Date of Patent: Oct. 14, 2025

(54) ***BACTROCERA OLEAE* ATTRACTANT COMPOSITION AND USES THEREOF**

(71) Applicant: CEARITIS, Evry-Courcouronnes (FR)

(72) Inventor: Marion Canale, Marseilles (FR)

( * ) Notice: Subject to any disclaimer, the term of this patent is extended or adjusted under 35 U.S.C. 154(b) by 17 days.

(21) Appl. No.: 18/040,585

(22) PCT Filed: Aug. 10, 2021

(86) PCT No.: PCT/EP2021/072282
§ 371 (c)(1),
(2) Date: Feb. 3, 2023

(87) PCT Pub. No.: WO2022/034085
PCT Pub. Date: Feb. 17, 2022

(65) Prior Publication Data
US 2023/0270105 A1  Aug. 31, 2023

(30) Foreign Application Priority Data
Aug. 14, 2020 (FR) ..................................... 2008505

(51) Int. Cl.
*A01N 27/00* (2006.01)
*A01M 1/02* (2006.01)
*A01M 1/06* (2006.01)
*A01N 35/02* (2006.01)
*A01P 19/00* (2006.01)

(52) U.S. Cl.
CPC ............... *A01N 27/00* (2013.01); *A01M 1/02* (2013.01); *A01M 1/06* (2013.01); *A01N 35/02* (2013.01); *A01P 19/00* (2021.08)

(58) Field of Classification Search
None
See application file for complete search history.

(56) References Cited

U.S. PATENT DOCUMENTS

| 9,549,546 B2 | 1/2017 | Saguchi et al. | |
|---|---|---|---|
| 10,244,750 B2 | 4/2019 | Ishibashi et al. | |
| 10,271,535 B2 | 4/2019 | Lillamand et al. | |
| 2002/0061324 A1* | 5/2002 | Light | A01M 1/02 424/405 |
| 2014/0308328 A1 | 10/2014 | Saguchi et al. | |
| 2020/0404897 A1 | 12/2020 | Lillamand et al. | |

FOREIGN PATENT DOCUMENTS

EP  0572743 A1  12/1993

OTHER PUBLICATIONS

Malheira et al (Identification of leaf volatiles from olive (*Olea europaea*) and their possible role in the ovipositional preferences of olive fly, Bactrocera oleae (Rossi) (Diptera: Tephritidae). Phytochemistry 121 (2016) 11-19) (Year: 2016).*
Gunti et al (Innate and Learned Responses of the Tephritid Parasitoid Psyttalia concolor (Hymenoptera: Braconidae) to Olive Volatiles Induced by Bactrocera oleae (Diptera: Tephritidae) Infestation. Journal of Economic Entomology, 109(6), 2016, 2272-2280). (Year: 2016).*
Malheiro et al. Identification of leaf volatiles from olive (*Olea europaea*) and their possible role in the ovipositional preferences of olive fly, Bactrocera oleae (Rossi) (Diptera:Tephritidae). Phytochemistry, 2015, 121, 11-19.
Malheiro et al. Electrophysiological response of Bactrocera oleae (Rossi) (Diptera: Tephritidae) adults to olive leaves essential oils from different cultivars and olive tree volatiles. Industrial Crops and Products, 2015, 77, 81-88.
Cha et al, Influence of trap design on upwind flight behavior and capture of female grape berry moth (Lepidoptera: Tortricidae) with a kairomone lure. Environmental Entomology, 2013, 42(1), 150-157.
Cha et al, Eavesdropping on plant volatiles by a specialist moth: significance of ration and concentration. PLOS ONE, 2011,6(2), e17033, 1-8.
Padmaja et al. Electrophysiological and behavioral respones of sorghum shoot fly, Atherigona soccata, to sorghum volatiles. Journal of Chemical Ecology, 2010, 36, 1346-1353.
Cha et al. Identification and filed evaluation of grape shoot volatiles attrative to female grape berry moth (*Paralobesia viteana*). Journal of Chemical Ecology, 2008, 34, 1180-1189.
Giunti et al, Olive fruit volatiles route intraspecific interactions and chemotaxis in Bactrocera oleae (Rossi) (Diptera: Tephritidae) females. Scientific reports, 2020, 10(1666), 1-10.

* cited by examiner

*Primary Examiner* — Jake M Vu
(74) *Attorney, Agent, or Firm* — Arrigo, Lee, Guttman & Mouta-Bellum LLP

(57) ABSTRACT

The present invention relates to a *Bactrocera oleae* attractant composition comprising at least one terpene and at least one carbonyl compound as active substances, and at least one excipient.

7 Claims, 6 Drawing Sheets

BACTROCERA OLEAE ATTRACTANT COMPOSITION AND USES THEREOF

FIELD OF THE INVENTION

Figure 1:
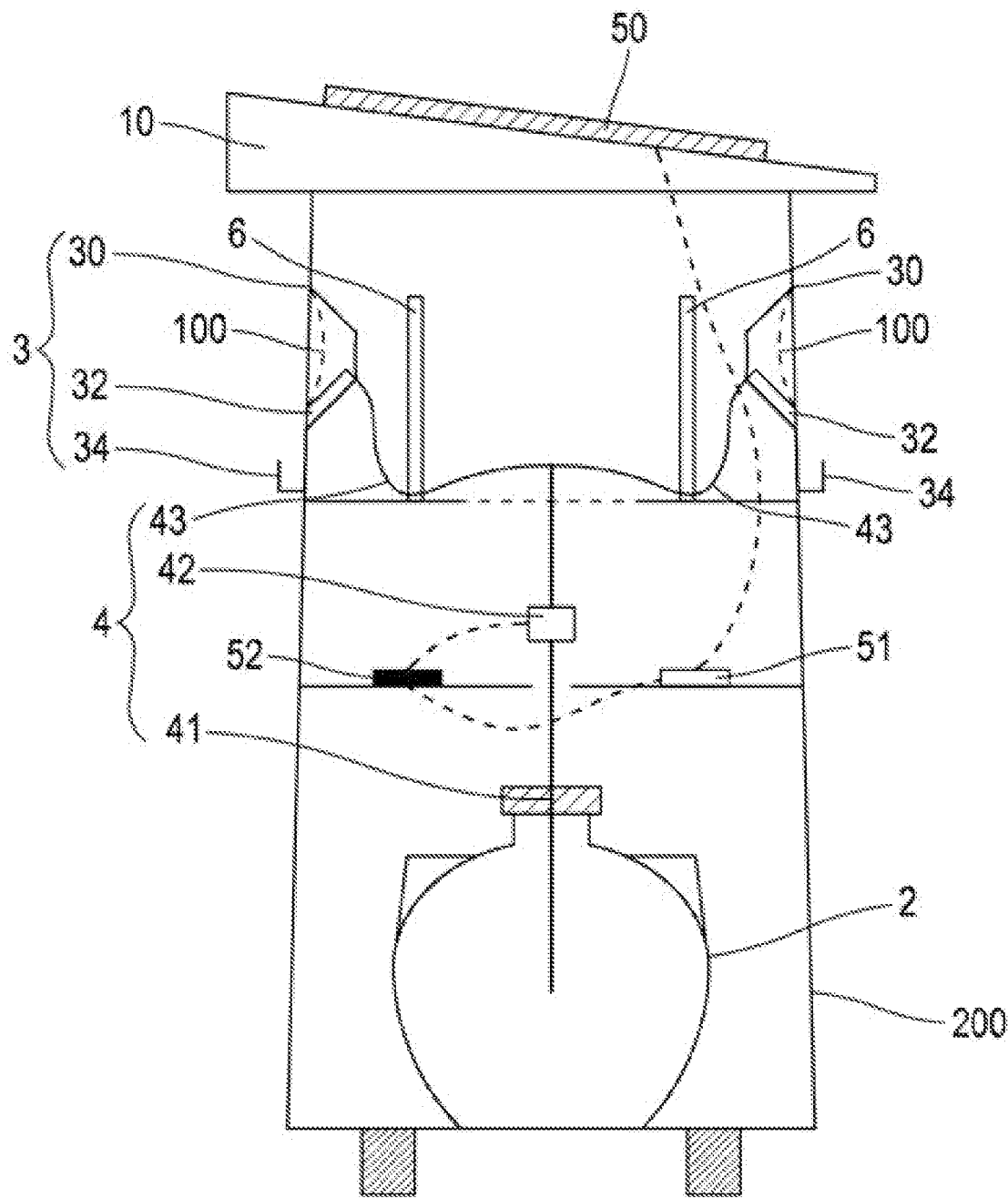

The present invention relates to the field of insect control, and more particularly the field of attractant compositions for insects, in particular for *Bactrocera oleae*, also called the olive fruit fly.

TECHNOLOGICAL BACKGROUND

The olive fruit fly, *Bactrocera oleae*, is the most devastating pest of olive trees. It belongs to the order Diptera, to the family Tephritidae and to the genus *Bactrocera*. The olive fruit fly, *Bactrocera oleae*, was detected for the first time in West Los Angeles in 1998 and was then found throughout California. Genetic studies on the Californian population revealed an eastern Mediterranean origin, very probably Cyprus, Israel and the neighbouring coast of Türkiye. In Mediterranean countries, the olive fruit fly is a historic pest of olives and includes three sub-populations, western Mediterranean (Portugal and Spain), central Mediterranean (Italy and Greece) and eastern Mediterranean.

The damage associated with *Bactrocera oleae* is widespread in France, in Europe and more generally around the world. First of all, the qualitative damage is taken into account. In fact, the larval development inside the olive impairs the organoleptic properties of the fruit. Then, the larval droppings together with the fact that the olive pulp comes into contact with the air lead to a significant degradation of the quality of the olive oil. Consequently, the olive oil becomes unsaleable. *Bactrocera oleae* also causes quantitative damage since the larva affects the fruit directly by reducing its attachment to the peduncle of the tree. This accelerates the fall of the olive and reduces the number of olives per tree. Annual harvests are greatly affected by *Bactrocera oleae*. In fact, between 5 and 30% of olives are lost every year due to this pest, despite the application of treatment (mainly mineral barriers for organic orchards). In the case of a severe infestation, the price of a litre of olive oil increases by €5 on average, and the olive grower loses 10% of their annual output. Their turnover decreases by €8 per litre of olive oil sold and their net profit is halved. These economic differences are the consequence of qualitative and quantitative damage mentioned previously. The struggle against the olive fruit fly has been going on for hundreds of years. The results of this relentless struggle have been unsatisfactory or very disappointing. Until 1930, farmers were barely able to influence the harvest or apply pesticides effectively. Consequently, they had no choice but to rely on luck to ensure successful harvests year after year.

Methods for controlling *Bactrocera oleae* infestations have been widely studied. A first type of treatment used consists of the application of insecticide. In the course of the last four decades, solutions based on organophosphates have been the most frequently used class of insecticide compounds, followed by pyrethroids, neonicotinoids and very recently the insecticide Spinosad. However, recent studies have indicated a resistance to organophosphorus insecticides in *Bactrocera oleae*. Mutations of the Ace gene, encoding acetylcholinesterase, have been identified as the underlying cause of this resistance. Since the existing chemical solutions are destined to gradually disappear, it is necessary to identify another way of treating the crops.

A second type of treatment used consists of the application of kaolin or white clay. By way of an example of a commercially available product based on kaolin, there may be mentioned in particular the product Surround WP® from De Sangosse containing 95% kaolin. This product covers the mature olive tree without any other impairment of the quality of the olive oil. Kaolin is an interesting and efficacious product because of its repellent and anti-ovipositional properties, since farmers lack treatments that are capable of killing the olive fruit fly at an immature stage. Nevertheless, the use of kaolin or white clay has many drawbacks, such as in particular the necessity of having to apply the kaolin or white clay several times a year. In addition, this method is less efficacious than the chemical treatment and will not prevent the proliferation of the olive fruit flies from one year to the next. The use of a biological control is a third interesting approach. In agronomy, biological control defines any strategy which uses living organisms to limit the proliferation and harmfulness of the different pests by taking advantage of the natural relationships that exist between individuals or species. Studies report the use of bioinsecticide based on *Beauveria bassiana* or even *Metarhizium brunneum*. The efficacy of the bioinsecticide was comparable to or greater than that of the reference chemical treatment with weekly application. In addition, StrainEAMb09/01-Su® from BioOne is particularly efficacious, since it is capable of causing a 60% mortality in adult *Bactrocera oleae*. However, the cost of this strategy as well as the application on the ground are constraints which prevent the use of this technique.

For this reason, it is necessary to develop a composition which makes it possible to control the olive fruit fly, in order to protect olive trees while respecting the environment and the crops, that is to say which is lacking in any pesticide and/or insecticide, inexpensive and easy to use.

Patent application EP2789236 describes a gel-type composition ensuring protection against the olive fruit fly comprising at least one volatile substance, in particular a sexual pheromone of the female olive fruit fly, in particular 1,7-dioxaspiro[5.5]undecane, and an oil gelling agent, said volatile substance being present in an quantity ranging from 70.0 to 99.0% by weight of the composition. However, this solution, in addition to consuming active substance, does not make it possible to trap both the male flies and the female flies. In fact, by using a female pheromone, the composition of patent application EP2789236 only makes it possible to attract the male *Bactrocera oleae*.

Quite surprisingly, the inventors have shown that the attractant composition of the invention has interesting properties, in particular as regards its ability to attract *Bactrocera oleae* in an efficacious manner and thus allow it to be captured. More particularly, the inventors have shown that the composition of the invention constitutes an efficacious lure, inasmuch as the composition is capable of directly influencing the behaviour of the olive fruit fly and has an attractiveness of more than 80%, in particular of 86%. By virtue of the active substances constituting the composition according to the invention, the composition is capable of guiding the olive fruit fly towards an oviposition site far away from the olive trees, making it possible to prevent the olive fruit fly from laying in and/or on the olives, guaranteeing an optimum olive yield. In addition, the inventors have shown that the attractant composition according to the invention makes it possible to trap both the male flies and the female flies.

Thus, the subject of the present invention is therefore an attractant composition for attracting insects of the species *Bactrocera oleae* comprising (Z)-beta-ocimene, (E)-betaocimene, beta-caryophyllene and decanal, as the only active substances, and at least one excipient.

Within the meaning of the present invention, by "composition" is meant a composition in liquid form, in particular in the form of a solution or suspension, as well as a composition in semi-solid form, advantageously in the form of gel, or a composition in solid form, advantageously in the form of powder, as well as a composition in gaseous or vaporized form. In a particular embodiment of the invention, the composition is in liquid form.

Within the meaning of the present invention, by "attractant composition" is meant a composition that is palatable to the targeted insects, and in particular to *Bactrocera oleae*. Advantageously, the attractant composition according to the invention is capable of attracting *Bactrocera oleae* and causing a stimulus to lay in *Bactrocera oleae*. Advantageously, the *Bactrocera oleae* attractant composition according to the invention is an attractant composition for attracting insects of the species *Bactrocera oleae*.

Within the meaning of the present invention, by "active substance" or "active substances" is meant a compound having a biological activity capable of attracting the targeted insects and in particular *Bactrocera oleae* and stimulating laying.

Advantageously, the *Bactrocera oleae* attractant composition according to the invention comprises at least one terpene and at least one carbonyl compound as active substances. Advantageously, the at least one terpene and the at least one carbonyl compound are kairomones from the olive tree.

Within the meaning of the present invention, by "kairomone" or "kairomone" is meant a volatile or mobile substance, produced in air, water or earth by a living being (emitter, which can be a plant, an animal, a fungus or a bacterial colony), released into the environment, which triggers a behavioural response in another species (receiver), benefitting the latter. Within the meaning of the present invention, kairomones are produced by the olive tree and trigger a behavioural response in the olive fruit fly, i.e. laying, by indicating the presence of mature fruit to them. The use of kairomones has many advantages. In particular, the use of kairomones makes it possible to trap both the male *Bactrocera oleae* flies and the female *Bactrocera oleae* flies. In addition, the use of kairomones constitutes a barrier to the outside of the plot to be treated. Finally, since the kairomones originate directly from the olive tree, this does not cause destruction of the fauna and in particular of the male or female *Bactrocera oleae*.

Within the meaning of the present invention, by "terpene" is meant a class of compounds derived from isoprene, which has the molecular formula $C_5H_8$. The basic molecular formula for terpenes comprises multiples of $C_5H_8$, i.e. $(C_5H_8)_n$ where n is the number of linked isoprene units. The isoprene units can be linked together "head to head" to form linear chains, which is then referred to as acyclic terpene. The isoprene units can be arranged to form rings, which is then referred to as cyclic terpene, advantageously monocyclic or bicyclic terpene. Terpenes can be classified depending on the number of terpene units in the molecule. Terpenes comprise hemiterpenes which comprise a single isoprene unit; monoterpenes which comprise two isoprene units and are represented by the formula $C_{10}H_{16}$; sesquiterpenes which comprise three isoprene units and are represented by the formula $C_{15}H_{24}$; diterpenes which comprise four isoprene units and are represented by the formula $C_{20}H_{32}$; sesterterpenes which comprise five isoprene units and have 25 carbon atoms and are represented by the formula $C_{25}H_{40}$; triterpenes which comprise six isoprene units and are represented by the formula $C_{30}H_{48}$; tetraterpenes which comprise eight terpene units and are represented by the formula $C_{40}H_{64}$ and polyterpenes which comprise long chains containing many isoprene units (for example, natural rubber which comprises polyisoprene). Advantageously, the at least one terpene is liquid at ambient temperature (25° C.).

In an advantageous embodiment of the invention, the at least one terpene is selected from the group comprising monoterpenes, sesquiterpenes or a combination thereof.

In a particular embodiment of the invention, the at least one terpene is a monoterpene. Advantageously, the at least one terpene is a combination of two monoterpenes, advantageously three monoterpenes, advantageously four monoterpenes, advantageously five monoterpenes, advantageously six monoterpenes. In another particular embodiment of the invention, the at least one terpene is a sesquiterpene. Advantageously, the at least one terpene is a combination of two sesquiterpenes, advantageously three sesquiterpenes, advantageously four sesquiterpenes, advantageously five sesquiterpenes, advantageously six sesquiterpenes. In a particular embodiment of the invention, the at least one terpene is a combination of at least one monoterpene with at least one sesquiterpene.

In a particularly advantageous embodiment of the invention, the at least one terpene is a combination of a monoterpene and a sesquiterpene. Advantageously, the at least one terpene is a combination of two monoterpenes and two sesquiterpenes, advantageously a combination of three monoterpenes and three sesquiterpenes, advantageously a combination of four monoterpenes and four sesquiterpenes, advantageously a combination of five monoterpenes and five sesquiterpenes, advantageously a combination of six monoterpenes and six sesquiterpenes.

In another particularly advantageous embodiment of the invention, the at least one terpene is a combination of one monoterpene and two sesquiterpenes, advantageously a combination of one monoterpene and three sesquiterpenes, advantageously a combination of one monoterpene and four sesquiterpenes, advantageously a combination of one monoterpene and five sesquiterpenes, advantageously a combination of one monoterpene and six sesquiterpenes.

In another particularly advantageous embodiment of the invention, the at least one terpene is a combination of two monoterpenes and one sesquiterpene. Advantageously, the at least one terpene is a combination of three monoterpenes and one sesquiterpene, advantageously a combination of four monoterpenes and one sesquiterpene, advantageously a combination of five monoterpenes and one sesquiterpene, advantageously a combination of six monoterpenes and one sesquiterpene.

Within the meaning of the present invention, monoterpenes include two isoprene units $(C_5H_8)$ according to the "head-to-tail" coupling method. They can be acyclic, monocyclic or bicyclic. In a particular embodiment of the invention, the at least one monoterpene is an acyclic monoterpene. In an advantageous embodiment of the invention, the at least one monoterpene is selected from the group comprising alpha-ocimene, (Z)-beta-ocimene, (E)-beta-ocimene, allo-ocimene or a combination thereof. Advantageously, the at least one monoterpene is a combination of (Z)-beta-ocimene and (E)-beta-ocimene.

Within the meaning of the present invention, sesquiterpenes include three isoprene units $(C_5H_8)$ according to the "head-to-tail" coupling method. They can be acyclic, monocyclic, bicyclic, tricyclic or polycyclic. Sesquiterpenes can be in an oxygenated form, i.e. substituted by alcohols, ketones, aldehydes, acids and/or lactones. In a particular embodiment of the invention, the at least one sesquiterpene is a bicyclic sesquiterpene. In an advantageous embodiment of the invention, the at least one sesquiterpene is beta-caryophyllene, also called trans-caryophyllene.

In an advantageous embodiment of the invention, the at least one carbonyl compound is selected from the group comprising an aldehyde and a ketone. In a particularly advantageous embodiment of the invention, the at least one carbonyl compound is an aldehyde. Advantageously, the aldehyde can be a linear aliphatic aldehyde having at least one carbon atom, advantageously 2 carbon atoms, advantageously 3 carbon atoms, advantageously 4 carbon atoms, advantageously 5 carbon atoms, advantageously 6 carbon atoms, advantageously 7 carbon atoms, advantageously 8 carbon atoms, advantageously 9 carbon atoms, advantageously 10 carbon atoms, advantageously 11 carbon atoms, advantageously 12 carbon atoms, advantageously 13 carbon atoms, advantageously 14 carbon atoms, advantageously 15 carbon atoms, advantageously 16 carbon atoms, advantageously 17 carbon atoms, advantageously 18 carbon atoms, advantageously 19 carbon atoms, advantageously 20 carbon atoms. Advantageously, the aldehyde can be a linear aliphatic aldehyde having 10 carbon atoms. In a particularly advantageous embodiment, the aldehyde is decanal.

In a particularly advantageous embodiment of the invention, the *Bactrocera oleae* attractant composition according to the invention comprises at least one terpene and at least one carbonyl compound as active substances. Advantageously, the active substances of the *Bactrocera oleae* attractant composition are a combination of at least one monoterpene, at least one sesquiterpene and at least one carbonyl compound. Advantageously, the active substances of the *Bactrocera oleae* attractant composition are a combination of at least one monoterpene, at least one sesquiterpene and at least one aldehyde. Advantageously, the active substances of the attractant composition are a specific combination of (Z)-beta-ocimene, (E)-beta-ocimene, beta-caryophyllene and decanal.

In a particularly advantageous embodiment of the invention, the *Bactrocera oleae* attractant composition according to the invention comprises at least one terpene and at least one carbonyl compound as the only active substances. In other words, the *Bactrocera oleae* attractant composition according to the invention does not comprise any other active substance. Advantageously, the *Bactrocera oleae* attractant composition according to the invention does not comprise toluene as active substance.

Advantageously, the *Bactrocera oleae* attractant composition according to the invention comprises (Z)-beta-ocimene, (E)-beta-ocimene, beta-caryophyllene and decanal as the only active substances. In particular, the inventors have shown that the specific combination of active substances of the attractant composition according to the invention has an attractant effect of the order of 86% on *Bactrocera oleae*.

In a particular embodiment of the invention, the active substances can be of natural or synthetic origin. In the context of the present invention, the term "natural origin" denotes an active substance of plant origin. Advantageously, the active substances according to the invention can be obtained by extraction from flowers, leaves, roots and/or seeds. Advantageously, the active substances according to the invention can be obtained from extract of olive tree, clove tree, hemp, rosemary, hop, citrus fruits, such as citrus trees, in particular grapefruit, orange, mandarin, clementine, pomelo or lemon, mango, buckwheat, coriander, lavender, thyme, mint, peppermint, the list being non-limitative.

In the context of the present invention, the term "synthetic origin" refers to an active substance obtained by semisynthesis or hemisynthesis, the structure of which is similar to or imitates at least partly the structure of the active substance of plant origin.

In a particular embodiment of the invention, the total content of at least one terpene is at least 55% by weight with respect to the total content of active substances of the composition according to the invention. Advantageously, the total content of terpenes is at least 70% by weight, at least 71% by weight, advantageously at least 72% by weight, advantageously at least 73% by weight, advantageously at least 74% by weight, advantageously at least 75% by weight, advantageously at least 76% by weight, advantageously at least 77% by weight, advantageously at least 78% by weight, advantageously at least 79% by weight, advantageously at least 80% by weight, advantageously at least 81% by weight, advantageously at least 82% by weight, advantageously at least 83% by weight, advantageously at least 84% by weight, advantageously at least 85% by weight, advantageously at least 86% by weight, advantageously at least 87% by weight, advantageously at least 88% by weight, advantageously at least 89% by weight, advantageously at least 90% by weight, advantageously at least 91% by weight, advantageously at least 92% by weight, advantageously at least 93% by weight, advantageously at least 94% by weight, advantageously at least 95% by weight with respect to the total content of active substances of the composition according to the invention. In a particular embodiment of the invention, the total content of at least one terpene is comprised between 70% and 95% by weight with respect to the total content of active substances of the composition according to the invention. Advantageously, the total content of at least one terpene is comprised between 75% and 95% by weight, advantageously between 80% and 95% by weight, advantageously between 85% and 90% by weight with respect to the total content of active substances of the composition according to the invention. In a particularly advantageous embodiment of the invention, the total content of at least one terpene is 85% by weight with respect to the total content of active substances of the composition according to the invention. In another particularly advantageous embodiment of the invention, the total content of at least one terpene is 90% by weight with respect to the total content of active substances of the composition according to the invention.

In a particular embodiment of the invention, the total content of at least one monoterpene is at least 5% by weight with respect to the total content of active substances of the composition according to the invention. Advantageously, the total content of at least one monoterpene is at least 6% by weight, advantageously at least 7% by weight, advantageously at least 8% by weight, advantageously at least 9% by weight, advantageously at least 10% by weight, advantageously at least 11% by weight, advantageously at least 12% by weight, advantageously at least 13% by weight, advantageously at least 14% by weight, advantageously at least 15% by weight, advantageously at least 16% by weight, advantageously at least 17% by weight, advantageously at least 18% by weight, advantageously at least 19% by weight, advantageously at least 20% by weight, advantageously at least 21% by weight, advantageously at least 22% by weight, advantageously at least 23% by weight, advantageously at least 24% by weight, advantageously at least 25% by weight, advantageously at least 26% by weight, advantageously at least 27% by weight, advantageously at least 28% by weight, advantageously at least 29% by weight, advantageously at least 30% by weight, advantageously at least 31% by weight, advantageously at least 32% by weight, advantageously at least 33% by weight, advantageously at least 34% by weight, advantageously at least 35% by weight, advantageously at least 36% by weight, advantageously at least 37% by weight, advantageously at least 38% by weight, advantageously at least 39% by weight, advantageously at least 40% by weight with respect to the total content of active substances of the composition according to the invention. In a particular embodiment of the invention, the total content of at least one monoterpene is comprised between 5% and 40% by weight with respect to the total content of active substances of the composition according to the invention. Advantageously, the total content of at least one monoterpene is comprised between 10% and 35% by weight, advantageously between 15% and 40% by weight, advantageously between 20% and 30% by weight, advantageously between 22% and 37% by weight, advantageously between 24% and 26% by weight with respect to the total content of active substances of the composition according to the invention. In a particularly advantageous embodiment of the invention, the total content of at least one monoterpene is 10% by weight with respect to the total content of active substances of the composition according to the invention. In another particularly advantageous embodiment of the invention, the total content of at least one monoterpene is 15% by weight with respect to the total content of active substances of the composition according to the invention. In another particularly advantageous embodiment of the invention, the total content of at least one monoterpene is 25% by weight with respect to the total content of active substances of the composition according to the invention.

In a particular embodiment of the invention, the total content of the combination (Z)-beta-ocimene and (E)-beta-ocimene is at least 5% by weight with respect to the total content of active substances of the composition according to the invention. Advantageously, the total content of the combination (Z)-beta-ocimene and (E)-beta-ocimene is at least 6% by weight, advantageously at least 7% by weight, advantageously at least 8% by weight, advantageously at least 9% by weight, advantageously at least 10% by weight, advantageously at least 11% by weight, advantageously at least 12% by weight, advantageously at least 13% by weight, advantageously at least 14% by weight, advantageously at least 15% by weight, advantageously at least 16% by weight, advantageously at least 17% by weight, advantageously at least 18% by weight, advantageously at least 19% by weight, advantageously at least 20% by weight, advantageously at least 21% by weight, advantageously at least 22% by weight, advantageously at least 23% by weight, advantageously at least 24% by weight, advantageously at least 25% by weight, advantageously at least 26% by weight, advantageously at least 27% by weight, advantageously at least 28% by weight, advantageously at least 29% by weight, advantageously at least 30% by weight, advantageously at least 31% by weight, advantageously at least 32% by weight, advantageously at least 33% by weight, advantageously at least 34% by weight, advantageously at least 35% by weight, advantageously at least 36% by weight, advantageously at least 37% by weight, advantageously at least 38% by weight, advantageously at least 39% by weight, advantageously at least 40% by weight with respect to the total content of active substances of the composition according to the invention. In a particular embodiment of the invention, the total content of the combination (Z)-beta-ocimene and (E)-beta-ocimene is comprised between 5% and 40% by weight with respect to the total content of active substances of the composition according to the invention. Advantageously, the total content of the combination (Z)-beta-ocimene and (E)-beta-ocimene is comprised between 10% and 35% by weight, advantageously between 15% and 40% by weight, advantageously between 20% and 30% by weight, advantageously between 22% and 37% by weight, advantageously between 24% and 26% by weight with respect to the total content of active substances of the composition according to the invention. In a particularly advantageous embodiment of the invention, the total content of the combination (Z)-beta-ocimene and (E)-beta-ocimene is 10% by weight with respect to the total content of active substances of the composition according to the invention. In another particularly advantageous embodiment of the invention, the total content of the combination (Z)-beta-ocimene and (E)-beta-ocimene is 15% by weight with respect to the total content of active substances of the composition according to the invention. In another particularly advantageous embodiment of the invention, the total content of the combination (Z)-beta-ocimene and (E)-beta-ocimene is 25% by weight with respect to the total content of active substances of the composition according to the invention.

In a particular embodiment of the invention, the total content of at least one sesquiterpene is at least 50% by weight with respect to the total content of active substances of the composition according to the invention. Advantageously, the total content of at least one sesquiterpene is at least 51% by weight, advantageously at least 52% by weight, advantageously at least 53% by weight, advantageously at least 54% by weight, advantageously at least 55% by weight, advantageously at least 56% by weight, advantageously at least 57% by weight, advantageously at least 58% by weight, advantageously at least 59% by weight, advantageously at least 60% by weight, advantageously at least 61% by weight, advantageously at least 62% by weight, advantageously at least 63% by weight, advantageously at least 64% by weight, advantageously at least 65% by weight, advantageously at least 66% by weight, advantageously at least 67% by weight, advantageously at least 68% by weight, advantageously at least 69% by weight, advantageously at least 70% by weight, advantageously at least 71% by weight, advantageously at least 72% by weight, advantageously at least 73% by weight, advantageously at least 74% by weight, advantageously at least 75% by weight, advantageously at least 76% by weight, advantageously at least 77% by weight, advantageously at least 78% by weight, advantageously at least 79% by weight, advantageously at least 80% by weight, advantageously at least 81% by weight, advantageously at least 82% by weight, advantageously at least 83% by weight, advantageously at least 84% by weight, advantageously at least 85% by weight, advantageously at least 86% by weight, advantageously at least 87% by weight, advantageously at least 88% by weight, advantageously at least 89% by weight, advantageously at least 90% by weight with respect to the total content of active substances of the composition according to the invention. In a particular embodiment of the invention, the total content of at least one sesquiterpene is comprised between 40% and 90% by weight with respect to the total content of active substances of the composition according to the invention. Advantageously, the total content of at least one sesquiterpene is comprised between 40% and 70% by weight, advantageously between 50% and 80% by weight with respect to the total content of active substances of the composition according to the invention. In a particularly advantageous embodiment of the invention, the total content of at least one sesquiterpene is 60% by weight with respect to the total content of active substances of the composition according to the invention. In another particularly advantageous embodiment of the invention, the total content of at least one sesquiterpene is 70% by weight with respect to the total content of active substances of the composition according to the invention. In another particularly advantageous embodiment of the invention, the total content of at least one sesquiterpene is 80% by weight with respect to the total content of active substances of the composition according to the invention.

In a particular embodiment of the invention, the total content of beta-caryophyllene is at least 40% by weight with respect to the total content of active substances of the composition according to the invention. Advantageously, the total content of beta-caryophyllene is at least 41% by weight, advantageously at least 42% by weight, advantageously at least 43% by weight, advantageously at least 44% by weight, advantageously at least 45% by weight, advantageously at least 46% by weight, advantageously at least 47% by weight, advantageously at least 48% by weight, advantageously at least 49% by weight, advantageously at least 50% by weight, at least 51% by weight, advantageously at least 52% by weight, advantageously at least 53% by weight, advantageously at least 54% by weight, advantageously at least 55% by weight, advantageously at least 56% by weight, advantageously at least 57% by weight, advantageously at least 58% by weight, advantageously at least 59% by weight, advantageously at least 60% by weight, advantageously at least 61% by weight, advantageously at least 62% by weight, advantageously at least 63% by weight, advantageously at least 64% by weight, advantageously at least 65% by weight, advantageously at least 66% by weight, advantageously at least 67% by weight, advantageously at least 68% by weight, advantageously at least 69% by weight, advantageously at least 70% by weight, advantageously at least 71% by weight, advantageously at least 72% by weight, advantageously at least 73% by weight, advantageously at least 74% by weight, advantageously at least 75% by weight, advantageously at least 76% by weight, advantageously at least 77% by weight, advantageously at least 78% by weight, advantageously at least 79% by weight, advantageously at least 80% by weight, advantageously at least 81% by weight, advantageously at least 82% by weight, advantageously at least 83% by weight, advantageously at least 84% by weight, advantageously at least 85% by weight, advantageously at least 86% by weight, advantageously at least 87% by weight, advantageously at least 88% by weight, advantageously at least 89% by weight, advantageously at least 90% by weight with respect to the total content of active substances of the composition according to the invention. In a particular embodiment of the invention, the total content of beta-caryophyllene is comprised between 40% and 90% by weight with respect to the total content of active substances of the composition according to the invention. Advantageously, the total content of beta-caryophyllene is comprised between 40% and 70% by weight, advantageously between 50% and 80% by weight with respect to the total content of active substances of the composition according to the invention. In a particularly advantageous embodiment of the invention, the total content of beta-caryophyllene is 60% by weight with respect to the total content of active substances of the composition according to the invention. In another particularly advantageous embodiment of the invention, the total content of beta-caryophyllene is 70% by weight with respect to the total content of active substances of the composition according to the invention. In another particularly advantageous embodiment of the invention, the total content of beta-caryophyllene is 80% by weight with respect to the total content of active substances of the composition according to the invention.

In a particular embodiment of the invention, the total content of at least one carbonyl compound is at least 5% by weight with respect to the total content of active substances of the composition according to the invention. Advantageously, the total content of at least one carbonyl compound is at least 6% by weight, advantageously at least 7% by weight, advantageously at least 8% by weight, advantageously at least 9% by weight, advantageously at least 10% by weight, advantageously at least 11% by weight, advantageously at least 12% by weight, advantageously at least 13% by weight, advantageously at least 14% by weight, advantageously at least 15% by weight, advantageously at least 16% by weight, advantageously at least 17% by weight, advantageously at least 18% by weight, advantageously at least 19% by weight, advantageously at least 20% by weight, advantageously at least 21% by weight, advantageously at least 22% by weight, advantageously at least 23% by weight, advantageously at least 24% by weight, advantageously at least 25% by weight, advantageously at least 26% by weight, advantageously at least 27% by weight, advantageously at least 28% by weight, advantageously at least 29% by weight, advantageously at least 30% by weight with respect to the total content of active substances of the composition according to the invention. In a particular embodiment of the invention, the total content of at least one carbonyl compound is comprised between 5% and 30% by weight with respect to the total content of active substances of the composition according to the invention. Advantageously, the total content of at least one carbonyl compound is comprised between 6% and 29% by weight, advantageously between 5% and 20% by weight, advantageously between 7% and 28% by weight, advantageously between 8% and 27% by weight, advantageously between 9% and 26% by weight, advantageously between 10% and 25% by weight with respect to the total content of active substances of the composition according to the invention. In a particularly advantageous embodiment of the invention, the total content of at least one carbonyl compound is 10% by weight with respect to the total content of active substances of the composition according to the invention. In another particularly advantageous embodiment of the invention, the total content of at least one carbonyl compound is 15% by weight with respect to the total content of active substances of the composition according to the invention.

In a particular embodiment of the invention, the total content of decanal is at least 5% by weight with respect to the total content of active substances of the composition according to the invention. Advantageously, the total content of decanal is at least 6% by weight, advantageously at least 7% by weight, advantageously at least 8% by weight, advantageously at least 9% by weight, advantageously at least 10% by weight, advantageously at least 11% by weight, advantageously at least 12% by weight, advantageously at least 13% by weight, advantageously at least 14% by weight, advantageously at least 15% by weight, advantageously at least 16% by weight, advantageously at least 17% by weight, advantageously at least 18% by weight, advantageously at least 19% by weight, advantageously at least 20% by weight, advantageously at least 21% by weight, advantageously at least 22% by weight, advantageously at least 23% by weight, advantageously at least 24% by weight, advantageously at least 25% by weight, advantageously at least 26% by weight, advantageously at least 27% by weight, advantageously at least 28% by weight, advantageously at least 29% by weight, advantageously at least 30% by weight with respect to the total content of active substances of the composition according to the invention. In a particular embodiment of the invention, the total content of decanal is comprised between 5% and 30% by weight with respect to the total content of active substances of the composition according to the invention. Advantageously, the total content of decanal is comprised between 6% and 29% by weight, advantageously between 5% and 20% by weight, advantageously between 7% and 28% by weight, advantageously between 8% and 27% by weight, advantageously between 9% and 26% by weight, advantageously between 10% and 25% by weight with respect to the total content of active substances of the composition according to the invention. In a particularly advantageous embodiment of the invention, the total content of decanal is 10% by weight with respect to the total content of active substances of the composition according to the invention. In another particularly advantageous embodiment of the invention, the total content of decanal is 15% by weight with respect to the total content of active substances of the composition according to the invention.

In a particularly advantageous embodiment of the invention, the at least one terpene represents at least 80% by weight with respect to the total content of active substances of the composition according to the invention and the at least one carbonyl compound represents at least 20% by weight with respect to the total content of active substances of the composition according to the invention. Advantageously, the at least one terpene represents at least 85% by weight with respect to the total content of active substances of the composition according to the invention and the at least one carbonyl compound represents at least 15% by weight with respect to the total content of active substances of the composition according to the invention. Advantageously, the at least one terpene represents 90% by weight with respect to the total content of active substances of the composition according to the invention and the at least one carbonyl compound represents 10% by weight with respect to the total content of active substances of the composition according to the invention.

In a particular embodiment of the invention,
the at least one monoterpene represents at least 10% by weight with respect to the total content of active substances of the composition according to the invention,
the at least one sesquiterpene represents at least 80% by weight with respect to the total content of active substances of the composition according to the invention, and
the at least one carbonyl compound represents at least 10% by weight with respect to the total content of active substances of the composition according to the invention.

In another particular embodiment of the invention,
the at least one monoterpene represents at least 25% by weight with respect to the total content of active substances of the composition according to the invention, the at least one sesquiterpene represents at least 60% by weight with respect to the total content of active substances of the composition according to the invention, and
the at least one carbonyl compound represents at least 15% by weight with respect to the total content of active substances of the composition according to the invention.

In another particular embodiment of the invention,
the at least one monoterpene represents at least 15% by weight with respect to the total content of active substances of the composition according to the invention,
the at least one sesquiterpene represents at least 70% by weight with respect to the total content of active substances of the composition according to the invention, and
the at least one carbonyl compound represents at least 15% by weight with respect to the total content of active substances of the composition according to the invention.

In another particular embodiment of the invention,
the combination (Z)-beta-ocimene and (E)-beta-ocimene represents between 15% and 40% by weight with respect to the total content of active substances of the composition,
beta-caryophyllene represents between 40% and 70% by weight with respect to the total content of active substances of the composition, and
decanal represents between 5.0% and 20% by weight with respect to the total content of active substances of the composition.

In another particular embodiment of the invention,
the combination (Z)-beta-ocimene and (E)-beta-ocimene represents 10% by weight with respect to the total content of active substances of the composition according to the invention,
beta-caryophyllene represents 80% by weight with respect to the total content of active substances of the composition according to the invention, and
decanal represents 10% by weight with respect to the total content of active substances of the composition according to the invention.

In another particular embodiment of the invention,
the combination (Z)-beta-ocimene and (E)-beta-ocimene represents 25% by weight with respect to the total content of active substances of the composition according to the invention,
beta-caryophyllene represents 60% by weight with respect to the total content of active substances of the composition according to the invention, and
decanal represents 15% by weight with respect to the total content of active substances of the composition according to the invention.

In another particular embodiment of the invention,
the combination (Z)-beta-ocimene and (E)-beta-ocimene represents 15% by weight with respect to the total content of active substances of the composition according to the invention,
beta-caryophyllene represents 70% by weight with respect to the total content of active substances of the composition according to the invention, and
decanal represents 15% by weight with respect to the total content of active substances of the composition according to the invention.

Advantageously, the *Bactrocera oleae* attractant composition according to the invention comprises at least one excipient. Advantageously, the at least one excipient makes it possible to stabilize and solubilize the active substances of the attractant composition.

In an advantageous embodiment of the invention, the at least one excipient is selected from the group comprising at least one oily agent, at least one emulsifier, at least one aqueous agent, at least one preservative or a combination thereof.

By way of examples of oily agents, there may be mentioned in particular natural or synthetic oils, of animal or plant origin. In a particular embodiment of the invention, the at least one oily agent is a vegetable oil, advantageously a natural vegetable oil, even more advantageously a vegetable oil from organic farming. Advantageously, the vegetable oil is selected from sunflower oil, sesame oil, rapeseed oil, sweet almond oil, groundnut oil, tamanu oil, palm oil, avocado oil, coconut oil, sea buckthorn oil, walnut oil, hazelnut oil, jojoba oil, olive oil, macadamia oil, castor oil, shea oil, borage oil, apricot oil, grapeseed oil, soya bean oil, safflower oil, rubber seed oil, linseed oil, cottonseed oil, argan oil, butter oil, copra oil, cereal germ oils such as wheat germ oil or a combination thereof, the list being non-limitative. In a particularly advantageous embodiment of the invention, the at least one oily agent is a rapeseed oil, advantageously a rapeseed oil from organic forming.

Within the meaning of the present invention, by "emulsifier" or "emulsifying agent" is meant a compound having an amphiphilic nature, i.e. possessing at least one hydrophilic group and at least one hydrophobic group. Advantageously, the hydrophobic group is a $C_8$-$C_{28}$ alkyl, capable of being saturated or non-saturated, linear or branched. Advantageously, the hydrophobic group is a linear $C_8$-$C_{28}$ alkyl. The at least one emulsifier according to the invention makes it possible to stabilize and homogenize the mixture of the at least one oily agent and the at least one aqueous agent, thus preventing them from separating into two separate phases. By way of examples of emulsifiers, there may be mentioned in particular: lecithin, also called phosphatidylcholine, in particular soy lecithin, sunflower lecithin and egg lecithin, glycerol monostearate, casein, mono- and diglycerides of fatty acids, polysorbate 20, polysorbate 80, mono- and diglyceride esters of fatty acids, such as acetic acid esters of mono- and diglycerides, lactic acid esters of mono- and diglycerides, succinic acid esters of mono- and diglycerides, diacetyltartaric esters of mono- and diglycerides, polysorbitan esters, polyglycerol esters of fatty acids, sucrose esters of fatty acids, monoglycerides, diglycerides, ethoxylated monoglycerides, sorbitan esters of fatty acids, phosphoric acid esters of mono- and diglycerides, glycerol esters of fatty acids, polyglycerol esters of fatty acids, cellulose, beeswax, lanolin, polymeric esters, such as Atlox 4916, marketed by Croda Europe Limited and a combination thereof, the list being non-limitative. According to a particular embodiment of the invention, the emulsifier can be a combination of several emulsifiers, advantageously a combination of at least two, advantageously at least three, advantageously at least four, advantageously at least five, advantageously at least six or more emulsifiers. Advantageously, the emulsifier is a combination of polysorbate 20 and polymeric esters, in particular a combination of polysorbate 20 and Atlox 4916.

By way of examples of aqueous agents, there may be mentioned in particular water, alcohols, in particular linear or branched $C_1$-$C_6$ alcohols, linear or branched $C_1$-$C_6$ alkanes, optionally substituted by a halogen selected from chlorine, bromine, iodine and fluorine, and a combination thereof. Advantageously, water can be a softened or non-softened, mineral or non-mineral water, a spring water, a distilled water. Advantageously, the at least one aqueous agent is distilled water.

By way of examples of preservatives, there may be mentioned in particular butylated hydroxytoluene, essential oils, seed extracts, salicylic acid, citric acid, vitamin E, ascorbic acid, fumaric acid, Cosgard, or a combination thereof, the list being non-limitative.

Advantageously, the *Bactrocera oleae* attractant composition according to the invention can comprise a combination of excipients. In a particular embodiment of the invention, the *Bactrocera oleae* attractant composition can comprise at least two different excipients, advantageously at least three different excipients, advantageously at least four different excipients, advantageously at least five different excipients, advantageously at least six or more different excipients.

In an advantageous embodiment of the invention, the combination of excipients can comprise:
  at least one oily agent, advantageously rapeseed oil, advantageously rapeseed oil from organic farming,
  at least one emulsifier, advantageously lecithin, advantageously soy lecithin,
  at least one aqueous agent, advantageously water.
Advantageously, the combination of excipients contains:
  at least one oily agent, advantageously rapeseed oil, advantageously rapeseed oil from organic farming,
  at least one emulsifier, advantageously lecithin, advantageously soy lecithin,
  at least one aqueous agent, advantageously water.
In another advantageous embodiment of the invention, the combination of excipients can comprise:
  at least one oily agent, advantageously rapeseed oil, advantageously rapeseed oil from organic farming,
  at least one emulsifier, advantageously a combination of polysorbate 20 and polymeric esters, in particular Atlox 4916,
  at least one preservative, advantageously butylated hydroxytoluene.
Advantageously, the combination of excipients contains:
  at least one oily agent, advantageously rapeseed oil, advantageously rapeseed oil from organic farming,
  at least one emulsifier, advantageously a combination of polysorbate 20 and polymeric esters, in particular Atlox 4916,
  at least one preservative, advantageously butylated hydroxytoluene.

In an advantageous embodiment of the invention, the *Bactrocera oleae* attractant composition according to the invention comprises:
  at least one terpene and at least one carbonyl compound, as active substances, and
  a combination of excipients.
In an advantageous embodiment of the invention, the *Bactrocera oleae* attractant composition according to the invention comprises:
  at least one terpene and at least one carbonyl compound, as the only active substances, and
  a combination of excipients.
In a particularly advantageous embodiment of the invention, the *Bactrocera oleae* attractant composition according to the invention comprises:
  at least one terpene and at least one carbonyl compound, as the only active substances, and
  a combination of excipients, comprising at least one oily agent, at least one emulsifier, and at least one aqueous agent.

In a particularly advantageous embodiment of the invention, the *Bactrocera oleae* attractant composition according to the invention comprises:
- at least one monoterpene, at least one sesquiterpene and at least one aldehyde, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention comprises:
- a combination of (Z)-beta-ocimene, (E)-beta-ocimene, beta-caryophyllene and decanal, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention comprises:
- a combination of (Z)-beta-ocimene, (E)-beta-ocimene, beta-caryophyllene and decanal, as the only active substances, and
- a combination of excipients, comprising rapeseed oil, soy lecithin and distilled water.

In another particularly advantageous embodiment of the invention, the *Bactrocera oleae* attractant composition according to the invention comprises:
- a combination of (Z)-beta-ocimene, (E)-beta-ocimene, beta-caryophyllene and decanal, as the only active substances, and
- a combination of excipients, comprising at least one oily agent, at least one emulsifier, and at least one preservative.

In another particularly advantageous embodiment of the invention, the *Bactrocera oleae* attractant composition according to the invention comprises:
- a combination of (Z)-beta-ocimene, (E)-beta-ocimene, beta-caryophyllene and decanal, as the only active substances, and
- a combination of excipients, comprising rapeseed oil, polysorbate 20, polymeric esters and butylated hydroxytoluene.

In an advantageous embodiment of the invention, the *Bactrocera oleae* attractant composition according to the invention is essentially constituted by:
- at least one terpene and at least one carbonyl compound, as the only active substances, and
- a combination of excipients.

In a particularly advantageous embodiment of the invention, the *Bactrocera oleae* attractant composition according to the invention is essentially constituted by:
- at least one terpene and at least one carbonyl compound, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention is essentially constituted by:
- at least one monoterpene, at least one sesquiterpene and at least one aldehyde, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention is essentially constituted by:
- a combination of (Z)-beta-ocimene, (E)-beta-ocimene, beta-caryophyllene and decanal, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention is essentially constituted by:
- a combination of (Z)-beta-ocimene, (E)-beta-ocimene, beta-caryophyllene and decanal, as the only active substances, and
- a combination of excipients, comprising rapeseed oil, soy lecithin and distilled water.

In another particularly advantageous embodiment of the invention, the *Bactrocera oleae* attractant composition according to the invention is essentially constituted by:
- a combination of (Z)-beta-ocimene, (E)-beta-ocimene, beta-caryophyllene and decanal, as the only active substances, and
- a combination of excipients, comprising at least one oily agent, at least one emulsifier, and at least one preservative.

In another particularly advantageous embodiment of the invention, the *Bactrocera oleae* attractant composition according to the invention is essentially constituted by:
- a combination of (Z)-beta-ocimene, (E)-beta-ocimene, beta-caryophyllene and decanal, as the only active substances, and
- a combination of excipients, comprising rapeseed oil, polysorbate 20, polymeric esters and butylated hydroxytoluene.

In an advantageous embodiment of the invention, the *Bactrocera oleae* attractant composition according to the invention contains:
- at least one terpene and at least one carbonyl compound, as the only active substances, and
- a combination of excipients.

In a particularly advantageous embodiment of the invention, the *Bactrocera oleae* attractant composition according to the invention contains:
- at least one terpene and at least one carbonyl compound, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention contains:
- at least one monoterpene, at least one sesquiterpene and at least one aldehyde, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention contains:
- a combination of (Z)-beta-ocimene, (E)-beta-ocimene, beta-caryophyllene and decanal, as the only active substances, and
- a combination of excipients, comprising at least one oily agent, at least one emulsifier, and at least one aqueous agent.

In a particularly advantageous embodiment of the invention, the *Bactrocera oleae* attractant composition according to the invention contains:
- a combination of (Z)-beta-ocimene, (E)-beta-ocimene, beta-caryophyllene and decanal, as the only active substances, and
- a combination of excipients, comprising rapeseed oil, soy lecithin and distilled water.

In another particularly advantageous embodiment of the invention, the *Bactrocera oleae* attractant composition according to the invention contains:
- a combination of (Z)-beta-ocimene, (E)-beta-ocimene, beta-caryophyllene and decanal, as the only active substances, and
- a combination of excipients, comprising at least one oily agent, at least one emulsifier, and at least one preservative.

In another particularly advantageous embodiment of the invention, the *Bactrocera oleae* attractant composition according to the invention contains:
- a combination of (Z)-beta-ocimene, (E)-beta-ocimene, beta-caryophyllene and decanal, as the only active substances, and
- a combination of excipients, comprising rapeseed oil, polysorbate 20, polymeric esters and butylated hydroxytoluene.

In an advantageous embodiment of the invention, the *Bactrocera oleae* attractant composition according to the invention comprises:
- from 0.5% to 50% by weight of active substances,
- from 2.0% to 60% by weight of the at least one oily agent,
- from 5.0% to 50% by weight of the at least one emulsifier, the % by weight being expressed with respect to the total weight of the total attractant composition. Advantageously, the *Bactrocera oleae* attractant composition according to the invention can also comprise:
- from 20% to 95% by weight of the at least one aqueous agent, or
- from 0.1% to 2.0% by weight of the at least one preservative.

In an advantageous embodiment of the invention, the *Bactrocera oleae* attractant composition according to the invention comprises:
- from 0.5% to 50% by weight of active substances,
- from 2.0% to 60% by weight of the at least one oily agent,
- from 5.0% to 50% by weight of the at least one emulsifier, and
- from 20% to 95% by weight of the at least one aqueous agent, the % by weight being expressed with respect to the total weight of the total attractant composition.

Advantageously, the *Bactrocera oleae* attractant composition according to the invention is characterized in that:
a) the active substances represent from 0.5% to 50% by weight of the total weight of the total attractant composition,
b) the at least one oily agent represents from 2.0% to 60% by weight of the total weight of the total attractant composition,
c) the at least one emulsifier represents from 5.0% to 50% by weight of the total weight of the total attractant composition, and
d) the at least one aqueous agent represents from 20% to 95% by weight of the total weight of the total attractant composition.

In another advantageous embodiment of the invention, the *Bactrocera oleae* attractant composition according to the invention comprises:
- from 0.5% to 50% by weight of active substances,
- from 2.0% to 60% by weight of the at least one oily agent,
- from 5.0% to 50% by weight of the at least one emulsifier, and
- from 0.1% to 2.0% by weight of the at least one preservative, the % by weight being expressed with respect to the total weight of the total attractant composition.

Advantageously, the *Bactrocera oleae* attractant composition according to the invention is characterized in that:
a) the active substances represent from 0.5% to 50% by weight of the total weight of the total attractant composition,
b) the at least one oily agent represents from 2.0% to 60% by weight of the total weight of the total attractant composition,
c) the at least one emulsifier represents from 5.0% to 50% by weight of the total weight of the total attractant composition, and
d) the at least one preservative represents from 0.1% to 2.0% by weight of the total weight of the total attractant composition.

Advantageously, the active substances represent at least 0.5%, advantageously at least 1%, advantageously at least 1.5%, advantageously at least 2%, advantageously at least 2.5%, advantageously at least 3%, advantageously at least 3.5%, advantageously at least 4%, advantageously at least 4.5%, advantageously at least 5%, advantageously at least 5.5%, advantageously at least 6%, advantageously at least 6.5%, advantageously at least 7%, advantageously at least 7.5%, advantageously at least 8%, advantageously at least 8.5%, advantageously at least 9%, advantageously at least 9.5%, advantageously at least 10%, advantageously at least 11%, advantageously at least 11.5%, advantageously at least 12%, advantageously at least 12.5%, advantageously at least 13%, advantageously at least 13.5%, advantageously at least 14%, advantageously at least 14.5%, advantageously at least 15%, advantageously at least 15.5%, advantageously at least 16%, advantageously at least 16.5%, advantageously at least 17%, advantageously at least 17.5%, advantageously at least 18%, advantageously at least 18.5%, advantageously at least 19%, advantageously at least 19.5%, advantageously at least 20%, advantageously at least 20.5%, advantageously at least 21%, advantageously at least 21.5%, advantageously at least 22%, advantageously at least 22.5%, advantageously at least 23%, advantageously at least 23.5%, advantageously at least 24%, advantageously at least 24.5%, advantageously at least 25%, advantageously at least 25.5%, advantageously at least 26%, advantageously at least 26.5%, advantageously at least 27%, advantageously at least 27.5%, advantageously at least 28%, advantageously at least 28.5%, advantageously at least 29%, advantageously at least 29.5%, advantageously at least 30%, advantageously at least 30.5%, advantageously at least 31%, advantageously at least 31.5%, advantageously at least 32%, advantageously at least 32.5%, advantageously at least 33%, advantageously at least 33.5%, advantageously at least 34%, advantageously at least 34.5%, advantageously at least 35%, advantageously at least 35.5%, advantageously at least 36%, advantageously at least 36.7%, advantageously at least 37%, advantageously at least 37.5%, advantageously at least 38%, advantageously at least 38.5%, advantageously at least 39%, advantageously at least 39.5%, advantageously at least 40%, advantageously at least 40.5%, advantageously at least 41%, advantageously at least 41.5%, advantageously at least 42%, advantageously at least 42.5%, advantageously at least 43%, advantageously at least 43.5%, advantageously at least 44%, advantageously at least 44.5%, advantageously at least 45%, advantageously at least 45.5%, advantageously at least 46%, advantageously at least 46.5%, advantageously at least 47%, advantageously at least 47.5%, advantageously at least 48%, advantageously at least 48.5%, advantageously at least 49%, advantageously at least 49.5%, advantageously at least 50% by weight of the total weight of the total attractant composition. Advantageously, said active substances represent from 0.5% to 50% by weight of the total weight of the attractant composition, advantageously from 5.0% to 50% by weight, advantageously from 10.0% to 50% by weight, advantageously from 15.0% to 50% by weight, advantageously from 20.0% to 50% by weight, advantageously from 25.0% to 50% by weight, advantageously from 30.0% to 50% by weight, advantageously from 30.0% to 45% by weight, advantageously from 30.0% to 40% by weight of the total weight of the attractant composition.

Advantageously, the at least one oily agent represents at least 2.0%, advantageously at least 2.5%, advantageously at least 3%, advantageously at least 3.5%, advantageously at least 4%, advantageously at least 4.5%, advantageously at least 5%, advantageously at least 5.5%, advantageously at least 6%, advantageously at least 6.5%, advantageously at least 7%, advantageously at least 7.5%, advantageously at least 8%, advantageously at least 8.5%, advantageously at least 9%, advantageously at least 9.5%, advantageously at least 10%, advantageously at least 10.5%, advantageously at least 11%, advantageously at least 11.5%, advantageously at least 12%, advantageously at least 12.5%, advantageously at least 13%, advantageously at least 13.5%, advantageously at least 14%, advantageously at least 14.5%, advantageously at least 15%, advantageously at least 15.5%, advantageously at least 16%, advantageously at least 16.5%, advantageously at least 17%, advantageously at least 17.5%, advantageously at least 18%, advantageously at least 18.5%, advantageously at least 19%, advantageously at least 19.5%, advantageously at least 20%, advantageously at least 20.5%, advantageously at least 21%, advantageously at least 21.5%, advantageously at least 22%, advantageously at least 22.5%, advantageously at least 23%, advantageously at least 23.5%, advantageously at least 24%, advantageously at least 24.5%, advantageously at least 25%, advantageously at least 25.5%, advantageously at least 26%, advantageously at least 26.5%, advantageously at least 27%, advantageously at least 27.5%, advantageously at least 28%, advantageously at least 28.5%, advantageously at least 29%, advantageously at least 29.5%, advantageously at least 30%, advantageously at least 30.5%, advantageously at least 31%, advantageously at least 31.5%, advantageously at least 32%, advantageously at least 32.5%, advantageously at least 33%, advantageously at least 33.5%, advantageously at least 34%, advantageously at least 34.5%, advantageously at least 35%, advantageously at least 35.5%, advantageously at least 36%, advantageously at least 36.5%, advantageously at least 37%, advantageously at least 37.5%, advantageously at least 38%, advantageously at least 38.5%, advantageously at least 39%, advantageously at least 39.5%, advantageously at least 40%, advantageously at least 40.5%, advantageously at least 41%, advantageously at least 41.5%, advantageously at least 42%, advantageously at least 42.5%, advantageously at least 43%, advantageously at least 43.5%, advantageously at least 44%, advantageously at least 44.5%, advantageously at least 45%, advantageously at least 45.5%, advantageously at least 46%, advantageously at least 46.5%, advantageously at least 47%, advantageously at least 47.5%, advantageously at least 48%, advantageously at least 48.5%, advantageously at least 49%, advantageously at least 49.5%, advantageously at least 50%, advantageously at least 50.5%, advantageously at least 51%, advantageously at least 51.5%, advantageously at least 52%, advantageously at least 52.5%, advantageously at least 53%, advantageously at least 53.5%, advantageously at least 54%, advantageously at least 54.5%, advantageously at least 55%, advantageously at least 55.5%, advantageously at least 56%, advantageously at least 56.5%, advantageously at least 57%, advantageously at least 57.5%, advantageously at least 58%, advantageously at least 58.5%, advantageously at least 59%, advantageously at least 59.5%, advantageously at least 60%, by weight of the total weight of the total attractant composition.

Advantageously, the at least one emulsifier represents at least 5.0%, advantageously 5.5%, advantageously 6%, advantageously at least 6.5%, advantageously at least 7%, advantageously at least 7.5%, advantageously at least 8%, advantageously at least 8.5%, advantageously at least 9%, advantageously at least 9.5%, advantageously at least 10%, advantageously at least 11%, advantageously at least 11.5%, advantageously at least 12%, advantageously at least 12.5%, advantageously at least 13%, advantageously at least 13.5%, advantageously at least 14%, advantageously at least 14.5%, advantageously at least 15%, advantageously at least 15.5%, advantageously at least 16%, advantageously at least 16.5%, advantageously at least 17%, advantageously at least 17.5%, advantageously at least 18%, advantageously at least 18.5%, advantageously at least 19%, advantageously at least 19.5%, advantageously at least 20%, advantageously at least 20.5%, advantageously at least 21%, advantageously at least 21.5%, advantageously at least 22%, advantageously at least 22.5%, advantageously at least 23%, advantageously at least 23.5%, advantageously at least 24%, advantageously at least 24.5%, advantageously at least 25%, advantageously at least 25.5%, advantageously at least 26%, advantageously at least 26.5%, advantageously at least 27%, advantageously at least 27.5%, advantageously at least 28%, advantageously at least 28.5%, advantageously at least 29%, advantageously at least 29.5%, advantageously at least 30%, advantageously at least 30.5%, advantageously at least 31%, advantageously at least 31.5%, advantageously at least 32%, advantageously at least 32.5%, advantageously at least 33%, advantageously at least 33.5%, advantageously at least 34%, advantageously at least 34.5%, advantageously at least 35%, advantageously at least 35.5%, advantageously at least 36%, advantageously at least 36.7%, advantageously at least 37%, advantageously at least 37.5%, advantageously at least 38%, advantageously at least 38.5%, advantageously at least 39%, advantageously at least 39.5%, advantageously at least 40%, advantageously at least 40.5%, advantageously at least 41%, advantageously at least 41.5%, advantageously at least 42%, advantageously at least 42.5%, advantageously at least 43%, advantageously at least 43.5%, advantageously at least 44%, advantageously at least 44.5%, advantageously at least 45%, advantageously at least 45.5%, advantageously at least 46%, advantageously at least 46.5%, advantageously at least 47%, advantageously at least 47.5%, advantageously at least 48%, advantageously at least 48.5%, advantageously at least 49%, advantageously at least 49.5%, advantageously at least 50% by weight of the total weight of the total attractant composition.

Advantageously, the at least one aqueous agent represents at least 20%, advantageously at least 21%, advantageously at least 22%, advantageously at least 23%, advantageously at least 24%, advantageously at least 25%, advantageously at least 26%, advantageously at least 27%, advantageously at least 28%, advantageously at least 29%, advantageously at least 30%, advantageously at least 31%, advantageously at least 32%, advantageously at least 33%, advantageously at least 34%, advantageously at least 35%, advantageously at least 36%, advantageously at least 37%, advantageously at least 38%, advantageously at least 39%, advantageously at least 40%, advantageously at least 41%, advantageously at least 42%, advantageously at least 43%, advantageously at least 44%, advantageously at least 45%, advantageously at least 46%, advantageously at least 47%, advantageously at least 48%, advantageously at least 49%, advantageously at least 50%, advantageously at least 51%, advantageously at least 52%, advantageously at least 53%, advantageously at least 54%, advantageously at least 55%, advantageously at least 56%, advantageously at least 57%, advantageously at least 58%, advantageously at least 59%, advantageously at least 60%, advantageously at least 61%, advantageously at least 62%, advantageously at least 63%, advantageously at least 64%, advantageously at least 65%, advantageously at least 66%, advantageously at least 67%, advantageously at least 68%, advantageously at least 69%, advantageously at least 70%, advantageously at least 71%, advantageously at least 72%, advantageously at least 73%, advantageously at least 74%, advantageously at least 75%, advantageously at least 76%, advantageously at least 77%, advantageously at least 78%, advantageously at least 79%, advantageously at least 80%, advantageously at least 81%, advantageously at least 82%, advantageously at least 83%, advantageously at least 84%, advantageously at least 85%, advantageously at least 86%, advantageously at least 87%, advantageously at least 88%, advantageously at least 89%, advantageously at least 90%, advantageously at least 91%, advantageously at least 92%, advantageously at least 93%, advantageously at least 94%, advantageously at least 95% by weight of the total weight of the total attractant composition.

Advantageously, the at least one preservative represents at least 0.1%, advantageously at least 0.2%, advantageously at least 0.3%, advantageously at least 0.4%, advantageously at least 0.5%, advantageously at least 0.6%, advantageously at least 0.7%, advantageously at least 0.8%, advantageously at least 0.9%, advantageously at least 1.0%, advantageously at least 1.1%, advantageously at least 1.2%, advantageously at least 1.3%, advantageously at least 1.4%, advantageously at least 1.5%, advantageously at least 1.6%, advantageously at least 1.7%, advantageously at least 1.8%, advantageously at least 1.9%, advantageously at least 2.0%.

In another particular embodiment, the attractant composition does not comprise an aqueous agent.

Advantageously, the active substances comprise at least one terpene and at least one carbonyl compound. Advantageously, the active substances of the *Bactrocera oleae* attractant composition are a combination of at least one monoterpene, at least one sesquiterpene and at least one carbonyl compound. Advantageously, the active substances of the *Bactrocera oleae* attractant composition are a combination of at least one monoterpene, at least one sesquiterpene and at least one aldehyde.

Advantageously, the active substances of the attractant composition are the combination of (Z)-beta-ocimene, (E)-beta-ocimene, beta-caryophyllene and decanal.

Advantageously, the at least one oily agent is a vegetable oil. Advantageously, the vegetable oils are selected from sunflower oil, sesame oil, rapeseed oil, sweet almond oil, groundnut oil, tamanu oil, palm oil, avocado oil, coconut oil, sea buckthorn oil, walnut oil, hazelnut oil, jojoba oil, olive oil, macadamia oil, castor oil, shea oil, borage oil, apricot oil, grapeseed oil, soya bean oil, safflower oil, rubber seed oil, linseed oil, cottonseed oil, argan oil, butter oil, copra oil, cereal germ oils such as wheat germ oil or a combination thereof, the list being non-limitative. Advantageously, the at least one oily agent is a rapeseed oil, advantageously a rapeseed oil from organic farming.

Advantageously, the at least one sugar is a carbohydrate. Advantageously, the at least one emulsifier is lecithin, advantageously soy lecithin. Advantageously, the at least one emulsifier is a combination of polysorbate 20 and polymeric esters, in particular Atlox 4916. Advantageously, the preservative is butylated hydroxytoluene. Advantageously, the at least one aqueous agent is distilled water. Advantageously, the *Bactrocera oleae* attractant composition according to the invention comprises:

2.5% by weight of active substances,
7.5% by weight of the at least one oily agent,
20% by weight of the at least one emulsifier, and
70% by weight of the at least one aqueous agent, the % by weight being expressed with respect to the total weight of the total attractant composition.

In another particular embodiment of the invention, the attractant composition for attracting *Bactrocera oleae* according to the invention comprises:

at least 20%, advantageously at least 25%, advantageously at least 30%, advantageously at least 35%, at least 40% by weight of active substances, at least 40%, advantageously at least 45%, advantageously at least 50% by weight of the at least one oily agent, at least 5.0%, advantageously at least 8.0%, advantageously at least 10.0%, by weight of the at least one emulsifier, and at least 0.1%, advantageously at least 0.3%, advantageously at least 0.4% by weight of the at least one preservative, the % by weight being expressed with respect to the total weight of the total attractant composition.

In another particular embodiment of the invention, the attractant composition for attracting insects of the species *Bactrocera oleae* according to one of claims 1 to 5, in which:

the active substances represent from 20% to 50% by weight of the total weight of the total attractant composition, the at least one oily agent represents from 2.0% to 60% by weight of the total weight of the total attractant composition, the at least one emulsifier represents from 5.0% to 50% by weight of the total weight of the total attractant composition, and the at least one preservative represents from 0.1% to 2.0% by weight of the total weight of the total attractant composition.

In another particular embodiment of the invention, the attractant composition for attracting *Bactrocera oleae* according to the invention comprises:

between 30% and 40% by weight of active substances,
between 45% and 60% by weight of the at least one oily agent,
between 5.0% and 15% by weight of the at least one emulsifier,
between 0.1% and 0.5% by weight of the at least one preservative, the % by weight being expressed with respect to the total weight of the total attractant composition.

In an even more advantageous embodiment of the invention, the attractant composition for attracting *Bactrocera oleae* according to the invention comprises:

35.0% by weight of active substances,
54.60% by weight of the at least one oily agent, 10.0% by weight of the at least one emulsifier, and
0.4% by weight of the at least one preservative,
the % by weight being expressed with respect to the total weight of the total attractant composition.

In an even more advantageous embodiment of the invention, the attractant composition for attracting *Bactrocera oleae* according to the invention comprises:
35.0% by weight of a combination of (Z)-beta-ocimene, (E)-beta-ocimene, beta-caryophyllene and decanal,
54.60% by weight of rapeseed oil,
10.0% by weight of a combination of polysorbate 20 and polymeric esters, and
0.4% by weight of butylated hydroxytoluene
the % by weight being expressed with respect to the total weight of the total attractant composition.

In a particularly advantageous embodiment, the *Bactrocera oleae* attractant composition can be in the form of a sustained-release formulation. Within the meaning of the present invention, by "sustained-release formulation" is meant a dosage form suitable for a slow, progressive, controlled and continuous release of the active substances into the environment.

Several strategies exist for preparing such a composition, of which the active substance or active substances are only released progressively into the environment. Some strategies comprise the covalent bonding of the composition with a carrier. Excipients and vehicles which are degraded in particular by the micro-organisms present in the environment, or by exposure to light, in particular to ultraviolet rays, or by exposure to wind, or by the temperature, by oxidation, or else by humidity can also be used. All these strategies are well known to a person skilled in the art. A technique well known to a person skilled in the art for obtaining a composition in the form of a sustained-release formulation is encapsulation. According to an embodiment of the invention, the encapsulation can be an encapsulation in solid form or in liquid form. Advantageously, the encapsulation in liquid form. The encapsulation can be carried out by one of the methods selected from gelation techniques, spray drying, prilling (spray cooling or spray congealing), coating, emulsion/stabilization.

In a particular embodiment, the active substances of the *Bactrocera oleae* attractant composition can be formulated in solid forms, such as microparticles or nanoparticles. Advantageously, the active substances of the *Bactrocera oleae* attractant composition can also comprise at least one coating agent. The coating agent makes it possible in particular to protect the active substances of the *Bactrocera oleae* attractant composition, said active substances comprising at least one terpene and at least one carbonyl compound, and thus to prevent it from being degraded by the micro-organisms present in the environment, or by exposure to light, in particular to ultraviolet rays, or by exposure to wind, or by the temperature, by oxidation, or else by humidity. Advantageously, the coating agent can be selected from the group comprising: acrylic acid derivatives, methacrylic acid derivatives, ethyl acrylate derivatives, hydroxypropyl methylcellulose derivatives, polyvinyl acetate phthalate derivatives, poly(methyl acrylate-co-methyl methacrylate-co-methacrylic acid), poly(methacrylate acid-co-methyl methacrylate), hydroxypropyl methylcellulose (HPMCP), hydroxypropyl methylcellulose succinyl acetate, oils, waxes, gums, cyclodextrins or a mixture thereof. In a particularly advantageous embodiment, the coating agent is an oil. By way of examples of oils, there may be mentioned in particular natural or synthetic oils, of animal or plant origin. In a particular embodiment of the invention, the oil is a vegetable oil, advantageously a natural vegetable oil, even more advantageously a vegetable oil from organic farming. Advantageously, the vegetable oils are selected from sunflower oil, sesame oil, rapeseed oil, sweet almond oil, groundnut oil, tamanu oil, palm oil, avocado oil, coconut oil, sea buckthorn oil, walnut oil, hazelnut oil, jojoba oil, olive oil, macadamia oil, castor oil, shea oil, borage oil, apricot oil, grapeseed oil, soya bean oil, safflower oil, rubber seed oil, linseed oil, cottonseed oil, argan oil, butter oil, copra oil, cereal germ oils such as wheat germ oil or a combination thereof, the list being non-limitative. In a particularly advantageous embodiment of the invention, the coating agent is a rapeseed oil, advantageously a rapeseed oil from organic farming. In a particular embodiment, the *Bactrocera oleae* attractant composition in the form of a sustained-release formulation comprising at least one terpene and at least one carbonyl compound, as active substances, and at least one excipient as described above can comprise a monolayer of a single coating agent, a monolayer constituted by a mixture of several coating agents, a multilayer constituted by a single coating agent, a multilayer constituted by a mixture of several different coating agents or a superposition of several monolayers constituted by a single coating agent.

In another embodiment, formulations can be used which are coated with polymers that are degradable by the micro-organisms in the environment. Gels and hydrogels can also be used, in particular hydrogels based on polysaccharides.

Another aspect of the invention relates to a method for attracting and controlling *Bactrocera oleae*, comprising:
a) preparing the *Bactrocera oleae* attractant composition according to the invention, and
b) presenting an efficacious quantity of the *Bactrocera oleae* attractant composition to said *Bactrocera oleae* for ingestion.

Within the meaning of the present invention, by "efficacious quantity" is meant the quantity of attractant composition according to the invention that is necessary to attract the *Bactrocera oleae* and have a direct effect on its behaviour. The determination of an efficacious quantity depends specifically on factors such as the toxicity and the diffusion of the active substances in the air.

In a particular embodiment of the invention, the efficacious quantity represents at least 200 ng, advantageously at least 300 ng, advantageously at least 400 ng, advantageously at least 500 ng, advantageously at least 600 ng, advantageously at least 700 ng, advantageously at least 800 ng, advantageously at least 900 ng, advantageously at least 1 µg, advantageously at least 10 µg, advantageously at least 20 µg, advantageously at least 30 µg, advantageously at least 40 µg, advantageously at least 50 µg, advantageously at least 60 µg, advantageously at least 70 µg, advantageously at least 80 µg, advantageously at least 90 µg, advantageously at least 100 µg, advantageously at least 200 µg, advantageously at least 300 µg, advantageously at least 400 µg, advantageously at least 500 µg, advantageously at least 600 µg, advantageously at least 700 µg, advantageously at least 800 µg, advantageously at least 900 µg, advantageously at least 1 mg, advantageously at least 10 mg, advantageously at least 20 mg, advantageously at least 30 mg, advantageously at least 40 mg, advantageously at least 50 mg, advantageously at least 60 mg, advantageously at least 70 mg, advantageously at least 80 mg, advantageously at least 90 mg, advantageously at least 100 mg, advantageously at least 200 mg, advantageously at least 300 mg, advantageously at least 400 mg, advantageously at least 500 mg, advantageously at least 600 mg, advantageously at least 700 mg, advantageously at least 800 mg, advantageously at least 900 mg, advantageously at least 1 g, advantageously at least 1.5 g, advantageously at least 2 g, advantageously at least 2.5 g, advantageously at least 3 g, advantageously at least 3.5 g, advantageously at least 4 g, advantageously at least 4.5 g, advantageously at least 5 g, advantageously at least 5.5 g, advantageously at least 6 g, advantageously at least 6.5 g, advantageously at least 7 g, advantageously at least 7.5 g, advantageously at least 8 g, advantageously at least 8.5 g, advantageously at least 9 g, advantageously at least 9.5 g, advantageously at least 10 g, advantageously at least 10.5 g, advantageously at least 11 g, advantageously at least 11.5 g, advantageously at least 12 g, advantageously at least 12.5 g, advantageously at least 13 g, advantageously at least 13.5 g, advantageously at least 14 g, advantageously at least 14.5 g, advantageously at least 15 g, advantageously at least 15.5 g, advantageously at least 16 g, advantageously at least 16.5 g, advantageously at least 17 g, advantageously at least 17.5 g, advantageously at least 18 g, advantageously at least 18.5 g, advantageously at least 19 g, advantageously at least 19.5 g, advantageously at least 20 g.

In a particular embodiment, the efficacious quantity is comprised between 200 ng and 20 g, advantageously between 500 ng and 20 g, advantageously between 100 µg and 15 g, advantageously between 100 mg and 10 g, advantageously between 500 mg and 5 g, advantageously between 1 g and 4 g.

In a particular embodiment of the invention, the presentation of an efficacious quantity of the *Bactrocera oleae* attractant composition to said *Bactrocera oleae* for ingestion is carried out for a duration, called exposure duration, of at least 1 second. Advantageously, the exposure duration is at least 2 seconds, advantageously at least 3 seconds, advantageously at least 4 seconds, advantageously at least 5 seconds, advantageously at least 6 seconds, advantageously at least 7 seconds, advantageously at least 8 seconds, advantageously at least 9 seconds, advantageously at least 10 seconds, advantageously at least 15 seconds, advantageously at least 20 seconds, advantageously at least 25 seconds, advantageously at least 30 seconds, advantageously at least 35 seconds, advantageously at least 40 seconds, advantageously at least 45 seconds, advantageously at least 50 seconds, advantageously at least 55 seconds, advantageously at least 1 minute, advantageously at least 2 minutes, advantageously at least 3 minutes, advantageously at least 4 minutes, advantageously at least 5 minutes, advantageously at least 6 minutes, advantageously at least 7 minutes, advantageously at least 8 minutes, advantageously at least 9 minutes, advantageously at least 10 minutes, advantageously at least 15 minutes, advantageously at least 20 minutes, advantageously at least 25 minutes, advantageously at least 30 minutes, advantageously at least 35 minutes, advantageously at least 40 minutes, advantageously at least 45 minutes, advantageously at least 50 minutes, advantageously at least 55 minutes, advantageously at least 60 minutes, advantageously at least 65 minutes, advantageously at least 70 minutes, advantageously at least 75 minutes, advantageously at least 80 minutes, advantageously at least 85 minutes, advantageously at least 90 minutes, advantageously at least 95 minutes, advantageously at least 100 minutes, advantageously at least 105 minutes, advantageously at least 110 minutes, advantageously at least 115 minutes, advantageously at least 120 minutes, advantageously at least 3 hours, advantageously at least 4 hours, advantageously at least 5 hours, advantageously at least 6 hours, advantageously at least 7 hours, advantageously at least 8 hours, advantageously at least 9 hours, advantageously at least 10 hours, advantageously at least 11 hours, advantageously at least 12 hours.

In a particular embodiment, the presentation of an efficacious quantity of the *Bactrocera oleae* attractant composition to said *Bactrocera oleae* for ingestion is carried out for an exposure duration ranging from 1 second to 12 hours, advantageously from 1 minute to 6 hours, advantageously from 10 minutes to 4 hours, advantageously from 20 minutes to 120 minutes, advantageously from 30 minutes to 60 minutes.

In a particular embodiment of the invention, an efficacious quantity of from 1 g to 4 g is diffused every 120 minutes.

Another aspect of the invention relates to an installation for capturing *Bactrocera oleae*, comprising:
 a tank comprising the *Bactrocera oleae* attractant composition according to the invention, and
 means for diffusing the attractant composition into the atmosphere.

According to a particular embodiment, the installation is a box or a crate. Advantageously, at least one opening or window is created in at least one of the walls of said crate in order to allow *Bactrocera oleae* to enter the installation and the active substances of the attractant composition to diffuse towards the atmosphere. Advantageously, the opening or window can have any geometric shape whatsoever. Advantageously, the opening or window can have a circular shape, a square shape, a rectangular shape, a triangular shape, a hexagonal shape, an oval shape, a pentagonal shape, an ellipse shape, an octagonal shape, a diamond shape, a trapezium shape, or any other geometric shape. Advantageously, the installation comprises four openings, one opening per wall. Advantageously, the openings have a diameter of at least 20 cm. The terms "diameter" and "diagonal" are used in an equivalent and interchangeable manner depending on the shape of the opening. Thus, the openings can have a diameter or a diagonal of at least 20 cm. Advantageously, the openings have a diameter of at least 21 cm, advantageously at least 22 cm, advantageously at least 23 cm, advantageously at least 24 cm, advantageously at least 25 cm, advantageously at least 26 cm, advantageously at least 27 cm, advantageously at least 28 cm, advantageously at least 29 cm, advantageously at least 30 cm, advantageously at least 31 cm, advantageously at least 32 cm, advantageously at least 33 cm, advantageously at least 34 cm, advantageously at least 35 cm, advantageously at least 36 cm, advantageously at least 37 cm, advantageously at least 38 cm, advantageously at least 39 cm, advantageously at least 40 cm, advantageously at least 41 cm, advantageously at least 42 cm, advantageously at least 43 cm, advantageously at least 44 cm, advantageously at least 45 cm, advantageously at least 46 cm, advantageously at least 47 cm, advantageously at least 48 cm, advantageously at least 49 cm, advantageously at least 50 cm. Advantageously, the openings have a diameter comprised between 20 cm and 50 cm, advantageously between 25 cm and 50 cm, advantageously between 30 cm and 50 cm, advantageously between 35 and 50 cm, advantageously between 40 cm and 50 cm, advantageously between 45 cm and 50 cm, advantageously between 20 cm and 45 cm, advantageously between 20 cm and 40 cm, advantageously between 20 cm and 35 cm, advantageously between 20 and 30 cm, advantageously between 20 cm and 25 cm. Advantageously, the openings have a diameter of 20 cm.

Advantageously, the tank comprising the attractant composition has a capacity of at least 1 L, advantageously at least 2 L, advantageously at least 3 L, advantageously at least 4 L, advantageously at least 5 L, advantageously at least 6 L, advantageously at least 7 L, advantageously at least 8 L, advantageously at least 9 L, advantageously at least 10 L, advantageously at least 11 L, advantageously at least 12 L, advantageously at least 13 L, advantageously at least 14 L, advantageously at least 15 L, advantageously at least 16 L, advantageously at least 17 L, advantageously at least 18 L, advantageously at least 19 L, advantageously at least 20 L, advantageously at least 21 L, advantageously at least 22 L, advantageously at least 23 L, advantageously at least 24 L, advantageously at least 25 L, advantageously at least 26 L, advantageously at least 27 L, advantageously at least 28 L, advantageously at least 29 L, advantageously at least 30 L, advantageously at least 31 L, advantageously at least 32 L, advantageously at least 33 L, advantageously at least 34 L, advantageously at least 35 L, advantageously at least 36 L, advantageously at least 37 L, advantageously at least 38 L, advantageously at least 39 L, advantageously at least 40 L, advantageously at least 41 L, advantageously at least 42 L, advantageously at least 43 L, advantageously at least 44 L, advantageously at least 45 L, advantageously at least 46 L, advantageously at least 47 L, advantageously at least 48 L, advantageously at least 49 L, advantageously at least 50 L, advantageously at least 51 L, advantageously at least 52 L, advantageously at least 53 L, advantageously at least 54 L, advantageously at least 55 L, advantageously at least 56 L, advantageously at least 57 L, advantageously at least 58 L, advantageously at least 59 L, advantageously at least 60 L, advantageously at least 61 L, advantageously at least 62 L, advantageously at least 63 L, advantageously at least 64 L, advantageously at least 65 L, advantageously at least 66 L, advantageously at least 67 L, advantageously at least 68 L, advantageously at least 69 L, advantageously at least 70 L, advantageously at least 71 L, advantageously at least 72 L, advantageously at least 73 L, advantageously at least 74 L, advantageously at least 75 L, advantageously at least 76 L, advantageously at least 77 L, advantageously at least 78 L, advantageously at least 79 L, advantageously at least 80 L, advantageously at least 81 L, advantageously at least 82 L, advantageously at least 83 L, advantageously at least 84 L, advantageously at least 85 L, advantageously at least 86 L, advantageously at least 87 L, advantageously at least 88 L, advantageously at least 89 L, advantageously at least 90 L, advantageously at least 92 L, advantageously at least 93 L, advantageously at least 94 L, advantageously at least 95 L, advantageously at least 96 L, advantageously at least 97 L, advantageously at least 98 L, advantageously at least 99 L, advantageously at least 100 L.

Advantageously, the tank can be in different shapes, advantageously in any geometric shape whatsoever, such as for example rectangular, circular, cylindrical, cubic, spherical, hemispherical, conical, pyramidal, prism, parallelepipedal shapes. Within the meaning of the present invention, by "diffusion means" is meant means which make it possible to spread or disperse the active substances of the attractant composition into the atmosphere or outside the installation.

Preferably, the diffusion means are means for diffusing by evaporation. The diffusion means are arranged and configured to both contain and diffuse the attractant composition of the invention and make it possible for *Bactrocera oleae* to pass through towards the inside of the installation.

For example, the diffusion means comprise a diffusion container containing said composition or a diffusion surface over which said composition is spread. The surface can be a flat or curved sheet. The diffusion container can be a diffusion sphere, advantageously a hollow diffusion sphere, having one or more orifices on its surface, allowing the composition to diffuse.

According to an embodiment, the surface or the container is placed on the installation so as to be in contact with the external environment to allow evaporation.

According to another embodiment, when the diffusion container is a diffusion sphere, it is placed inside the installation.

Advantageously, the diffusion means are placed at the level of the openings.

According to a particular embodiment of the invention, the diffusion means can comprise at least one truncated element. Advantageously, the at least one truncated element is a hollow truncated element with open ends so as to allow *Bactrocera oleae* to pass through. The at least one truncated element has, at a first end, an orifice of small flow cross section and, at a second end, opposite the first, an orifice of large flow cross section, the large flow cross section being larger than the small flow cross section. The orifice of large flow cross section is placed towards the outside of the installation. Preferably, each orifice of large cross section of the truncated element is flush with an external wall of the installation. Advantageously, the at least one truncated element is placed at the level of at least one opening of the installation. Advantageously, one of the two orifices or one of the two ends of the at least one hollow truncated element is placed and arranged to be in direct contact with the opening. Advantageously, each truncated element forms an opening in a wall of the installation. More advantageously, the geometric shape and the size of the orifice of large cross section are identical to the geometric shape and the size of the opening.

According to an embodiment, the at least one truncated element comprises a slope and a storage means. Advantageously, the storage means can be an absorbent element, for example a sponge, and/or a basin, intended to receive and store the attractant composition. The storage means is arranged and placed so as to allow evaporation of the attractant composition. For example, the upper face of the basin or the absorbent element or the sponge is in contact with the air outside the installation.

According to another particular embodiment of the invention, the diffusion means comprise a diffusion sphere, advantageously a hollow diffusion sphere having one or more orifices on its surface. Advantageously, the attractant composition is contained in the lower part of the sphere. The attractant composition according to the invention diffuses from the interior of the sphere towards the external environment by passing through the orifices situated on the surface of the sphere. Advantageously, the diffusion sphere is situated inside the installation, advantageously in alignment with the openings, advantageously equidistant from the different openings. In this embodiment, the diffusion means do not have a truncated element.

Advantageously, the at least one truncated element and the diffusion container are made of an inert material, which does not interact with the attractant composition of the invention. Advantageously, the at least one truncated element and the diffusion container can be made of plastic, advantageously an inert plastic, i.e. which does not interact with the attractant composition of the invention. By way of examples of plastic capable of being used for the at least one truncated element and the diffusion container, there may be mentioned in particular polyethylene (PE), polypropylene (PP), polystyrene (PS), polycarbonate (PC), polyesters and polyethylene terephthalate (PET), polyacetals or polyoxymethylene (POM), polyvinyl chloride (PVC), polyamides (PA) and polymethyl methacrylate (PMMA), propylene, propene or a combination thereof, the list being non-limitative. Advantageously, the at least one truncated element is made of polymethyl methacrylate. Advantageously, the diffusion container is made of propylene or propene.

Advantageously, the diffusion means can contain at least 1 ml of the attractant composition, advantageously at least 2 ml, advantageously at least 3 ml, advantageously at least 4 ml, advantageously at least 5 ml, advantageously at least 6 ml, advantageously at least 7 ml, advantageously at least 8 ml, advantageously at least 9 ml, advantageously at least 10 ml, advantageously at least 11 ml, advantageously at least 12 ml, advantageously at least 13 ml, advantageously at least 14 ml, advantageously at least 15 ml, advantageously at least 16 ml, advantageously at least 17 ml, advantageously at least 18 ml, advantageously at least 19 ml, advantageously at least 20 ml, advantageously at least 21 ml, advantageously at least 22 ml, advantageously at least 23 ml, advantageously at least 24 ml, advantageously at least 25 ml, advantageously at least 50 ml, advantageously at least 75 ml, advantageously at least 100 ml, advantageously at least 150 ml, advantageously at least 200 ml, advantageously at least 250 ml, advantageously at least 300 ml, advantageously at least 350 ml, advantageously at least 400 ml, advantageously at least 450 ml, advantageously at least 500 ml, advantageously at least 550 ml, advantageously at least 600 ml, advantageously at least 650 ml, advantageously at least 700 ml, advantageously at least 750 ml, advantageously at least 800 ml, advantageously at least 850 ml, advantageously at least 900 ml, advantageously at least 950 ml, advantageously at least 1 L, of attractant composition. In a particularly advantageous embodiment, the diffusion means contain 10 ml of the attractant composition. In another particularly advantageous embodiment, the diffusion means contain between 100 ml and 1 L of the attractant composition, advantageously between 150 ml and 950 ml, advantageously between 200 ml and 900 ml, advantageously between 250 ml and 900 ml, advantageously between 300 ml and 850 ml, advantageously between 350 ml and 800 ml, advantageously between 400 ml and 750 ml, advantageously between 450 ml and 700 ml, advantageously between 500 ml and 650 ml, advantageously between 550 ml and 600 ml. Advantageously, the diffusion means contain between 500 ml and 750 ml.

According to a particular embodiment, the diffusion means can also comprise at least one fan making it possible to accelerate the diffusion of the active substances into the atmosphere. Advantageously, the at least one fan is placed so that the flow of air generated, for example by one or more blades, is directed towards the diffusion container, the diffusion surface or the storage means of the truncated element. According to another embodiment, the at least one fan is placed inside the installation so that the flow of air generated, for example by one or more blades, passes through the diffusion container and is expelled towards the outside of the installation.

According to a particular embodiment, the diffusion means can also comprise at least one receptacle arranged and configured to collect the surplus attractant composition. In an embodiment, each truncated element is associated with a receptacle. Advantageously, each receptacle is placed under a truncated element. Preferably, the receptacle is situated on an external wall of the installation below the large cross section of a truncated element. In another embodiment, the diffusion container is associated with a receptacle. Advantageously, the receptacle is placed in the bottom part of the diffusion sphere, allowing the surplus attractant composition as well as the attractant solution depleted in active substances to be collected.

The installation also comprises supply means arranged and configured to allow the transfer of the attractant composition contained in the tank to the diffusion means. According to a particular embodiment, the supply means comprise pipes connecting the tank to the diffusion means and a pump allowing the transfer from the tank to the diffusion means. Advantageously, the pump is a peristaltic pump.

The installation also comprises means for retaining *Bactrocera oleae*. According to a particular embodiment, the retention means comprise one or more sheets covered with glue, making it possible to retain the *Bactrocera oleae* when they have just landed on the sheet or sheets covered with glue. According to another embodiment, the retention means comprise one or more suction devices arranged and placed so as to suck in a flow of surrounding ambient air containing the *Bactrocera oleae* attracted by the attractant composition and comprising a *Bactrocera oleae* trap arranged with the suction device so that the *Bactrocera oleae* sucked in by the device are retained in the trap. Advantageously, the suction device continuously sucks in the flow of surrounding ambient air containing the *Bactrocera oleae* attracted by the diffusion of the attractant composition. Advantageously, the one or more suction means according to the invention are suitable for sucking in the ambient air at a rate comprised between 15 $m^3/H$ and 500 $m^3/H$, advantageously between 50 $m^3/H$ and 500 $m^3/H$, advantageously between 100 $m^3/H$ and 450 $m^3/H$, advantageously between 150 $m^3/H$ and 425 $m^3/H$, advantageously between 200 $m^3/H$ and 400 $m^3/H$, advantageously between 250 $m^3/H$ and 400 $m^3/H$, advantageously between 300 $m^3/H$ and 400 $m^3/H$, advantageously approximately 350 $m^3/H$. However, a person skilled in the art will know how to adapt the desired suction rate.

By way of examples of suction devices, there may be mentioned in particular those described in patent EP3177138 or patent application EP3761785. Advantageously, these suction devices comprise a hollow parallelepipedal box having, by way of example, a height comprised between 30 cm and 60 cm and sides the length of which is comprised between 10 cm and 20 cm. The box is shaped from a sheet comprising lateral panels connected to each other by folds allowing it to be assembled. It is ensured that the box keeps its shape by fixing by gluing, welding or by interlocking of the lateral edges of the panels. The sheet is also associated with a lid coming to close the upper part of the box after it has been assembled. This lid has a circular opening which forms a suction orifice and the diameter of which is, for example, comprised between 8 cm and 18 cm, this range of diameters making it possible to capture a large number of insects at once. The sheet is preferably made of plastic material of the expanded polypropylene type, preferably marketed under the brand name FOAMLITE®. The use of such a sheet has the same advantages in terms of weight, simplicity of assembly and reduced bulk as those mentioned previously with reference to the sheet. Once assembled, the box defines a hollow chamber inside which the insect trap is placed. The suction orifice leads into the insect trap, which trap is in the form of a flexible mesh bag, or net. It is attached, for example by means of a string or clamping collar at the level of the suction orifice. This net is advantageously reusable, and can be retrieved and changed from the door. The net can be associated with a sensor making it possible to indicate when it is full. The suction devices described in patent EP3177138 or patent application EP3761785 also comprise a suction means, advantageously in the form of a fan.

The retention means can be placed inside or outside the installation. According to an advantageous embodiment of the invention, when the retention means comprise one or more suction devices, the suction device or devices are situated outside the installation. According to a particular embodiment, the retention means are placed close to the diffusion means, advantageously close to the diffusion container or the diffusion surface or the small cross section of the truncated element. Advantageously, the retention means are placed at a distance of at least 1 mm, advantageously at least 2 mm, advantageously at least 3 mm, advantageously at least 4 mm, advantageously at least 5 mm, advantageously at least 6 mm, advantageously at least 7 mm, advantageously at least 8 mm, advantageously at least 9 mm, advantageously at least 1 cm, advantageously at least 2 cm, advantageously at least 3 cm, advantageously at least 4 cm, advantageously at least 5 cm, advantageously at least 6 cm, advantageously at least 7 cm, advantageously at least 8 cm, advantageously at least 9 cm, advantageously at least 10 cm, advantageously at least 11 cm, advantageously at least 12 cm, advantageously at least 13 cm, advantageously at least 14 cm, advantageously at least 15 cm, advantageously at least 16 cm, advantageously at least 17 cm, advantageously at least 18 cm, advantageously at least 19 cm, advantageously at least 20 cm from the storage means, advantageously at least 21 cm, advantageously at least 22 cm, advantageously at least 23 cm, advantageously at least 24 cm, advantageously at least 25 cm, advantageously at least 26 cm, advantageously at least 27 cm, advantageously at least 28 cm, advantageously at least 29 cm, advantageously at least 30 cm, advantageously at least 31 cm, advantageously at least 32 cm, advantageously at least 33 cm, advantageously at least 34 cm, advantageously at least 35 cm, advantageously at least 36 cm, advantageously at least 37 cm, advantageously at least 38 cm, advantageously at least 39 cm, advantageously at least 40 cm from the storage means. Advantageously, the retention means are placed at a distance comprised between 1 cm and 40 cm from the diffusion means, advantageously between 5 cm and 40 cm, advantageously between 10 cm and 40 cm, advantageously between 15 cm and 40 cm, advantageously between 20 cm and 40 cm, advantageously between 25 cm and 40 cm, advantageously between 30 cm and 40 cm, advantageously between 5 cm and 30 cm, advantageously between 10 cm and 30 cm, advantageously between 5 cm and 20 cm, advantageously between 5 cm and 40 cm from the diffusion means.

According to a particular embodiment, the installation can also comprise control means arranged and configured to control the supply means, for example the flow rate of the attractant composition transferred to the diffusion means. According to a particular embodiment, a volume of 10 ml of attractant solution is transferred to the diffusion means every two hours. According to another particular embodiment, a volume of 10 ml of attractant solution is transferred to the diffusion means every three hours. According to another particular embodiment, a volume of 10 ml of attractant solution is transferred to the diffusion means every hour. According to a particular embodiment, the installation can also comprise power supply means, making it possible to supply the supply and control means with power. For example, the power supply means can be solar panels, a battery and an electric motor actuating the pump of the supply means.

According to a particular embodiment, the installation is a box or a crate. Advantageously, at least one opening is created in at least one of the walls of said crate in order to allow *Bactrocera oleae* to enter the installation and the active substances of the attractant composition to diffuse towards the atmosphere. Advantageously, the installation comprises four openings, one opening per wall.

Advantageously, the diffusion means are placed at the level of these openings. More advantageously, the open end of the at least one hollow truncated element is placed and arranged to be in direct contact with the opening. Preferably, the geometric shape and the size of the orifice of large cross section are identical to the geometric shape and the size of the opening.

In a particular embodiment of the invention, the installation can be an installation made of wood, an installation made of plastic or an installation made of metal.

By way of examples of plastic capable of being used for the installation, there may be mentioned in particular polyethylene (PE), polypropylene (PP), polystyrene (PS), polycarbonate (PC), polyesters and polyethylene terephthalate (PET), polyacetals or polyoxymethylene (POM), polyvinyl chloride (PVC), polyamides (PA) and polymethyl methacrylate (PMMA) or a combination thereof, the list being non-limitative.

By way of examples of metal capable of being used for the installation, there may be mentioned in particular aluminium, stainless steel, iron, copper, the list being non-limitative.

Advantageously, said installation is an installation made of wood, which allows the installation to blend into the environment, while being ecological. Advantageously, the wood used to manufacture the installation can be selected from class 2 timbers, class 3 timbers, class 4 timbers and class 5 timbers.

Within the meaning of the present invention, by "class 2 timbers" is meant dry timbers which can occasionally be in contact with a humidity level greater than 20%. By way of examples of class 2 timbers, there may be mentioned in particular chestnut, sapupira, wenge, European oak, red cedar, louro preto, guariuba, robinia, jatoba, the list being non-limitative.

Within the meaning of the present invention, by "class 3 timbers" is meant timbers which can frequently be in contact with humidity, even beyond 20%. By way of examples of class 3 timbers, there may be mentioned in particular Douglas fir, larch, walnut, spruce, fir, Oregon pine, Scots pine, maritime pine, azobé and iroko, the list being non-limitative.

Within the meaning of the present invention, by "class 4 timbers" is meant timbers which can be in permanent contact with soft water, these timbers are more stabilized, they are rot-proof. By way of examples of class 4 timbers, there may be mentioned in particular oak, acacia, ipe, doussie, merbau, moabi, padauk, the list being non-limitative.

Within the meaning of the present invention, by "class 5 timbers" is meant timbers capable of being in permanent contact with salt water, these timbers are very durable. By way of examples of class 5 timbers, there may be mentioned in particular birch, ash, beech, teak, olive, the list being non-limitative.

Even more advantageously, the wood used to manufacture the installation is maritime pine.

According to another embodiment, said installation is an installation made of aluminium, which gives it a better resistance than wood faced with bad weather. In addition, an installation made of aluminium is easier to transport in terms of time and space. In addition, an installation made of aluminium has the advantage of being odourless.

Advantageously, the installation is totally stand-alone and mobile. By "stand-alone" is meant an installation which powers itself. By "mobile" is meant an installation which can be displaced in terms of time and space.

We will now describe an installation such as represented in FIGS. 1 to 5.

With reference to FIGS. 1 and 2 and 5 and 6, the installation is a rectangular box comprising four vertical walls 200 and a roof 10. Each vertical wall 200 has an opening or window 100 in order to allow *Bactrocera oleae* to enter the installation and the active substances of the attractant composition to diffuse towards the atmosphere. Preferably, each opening 100 is situated at a height of approximately between 75 cm and 1 m with respect to the ground.

Figure 5:
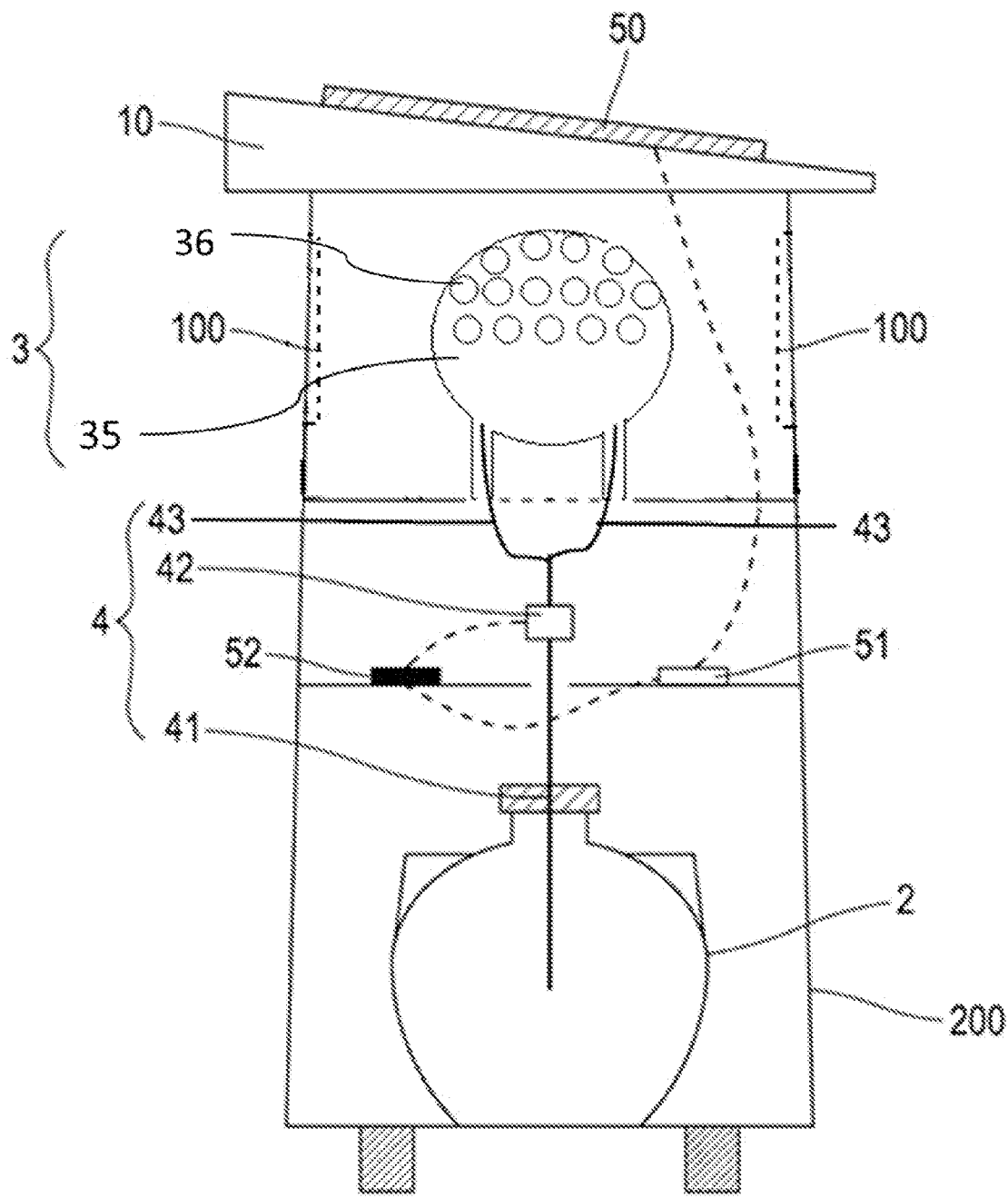
Figure 6:
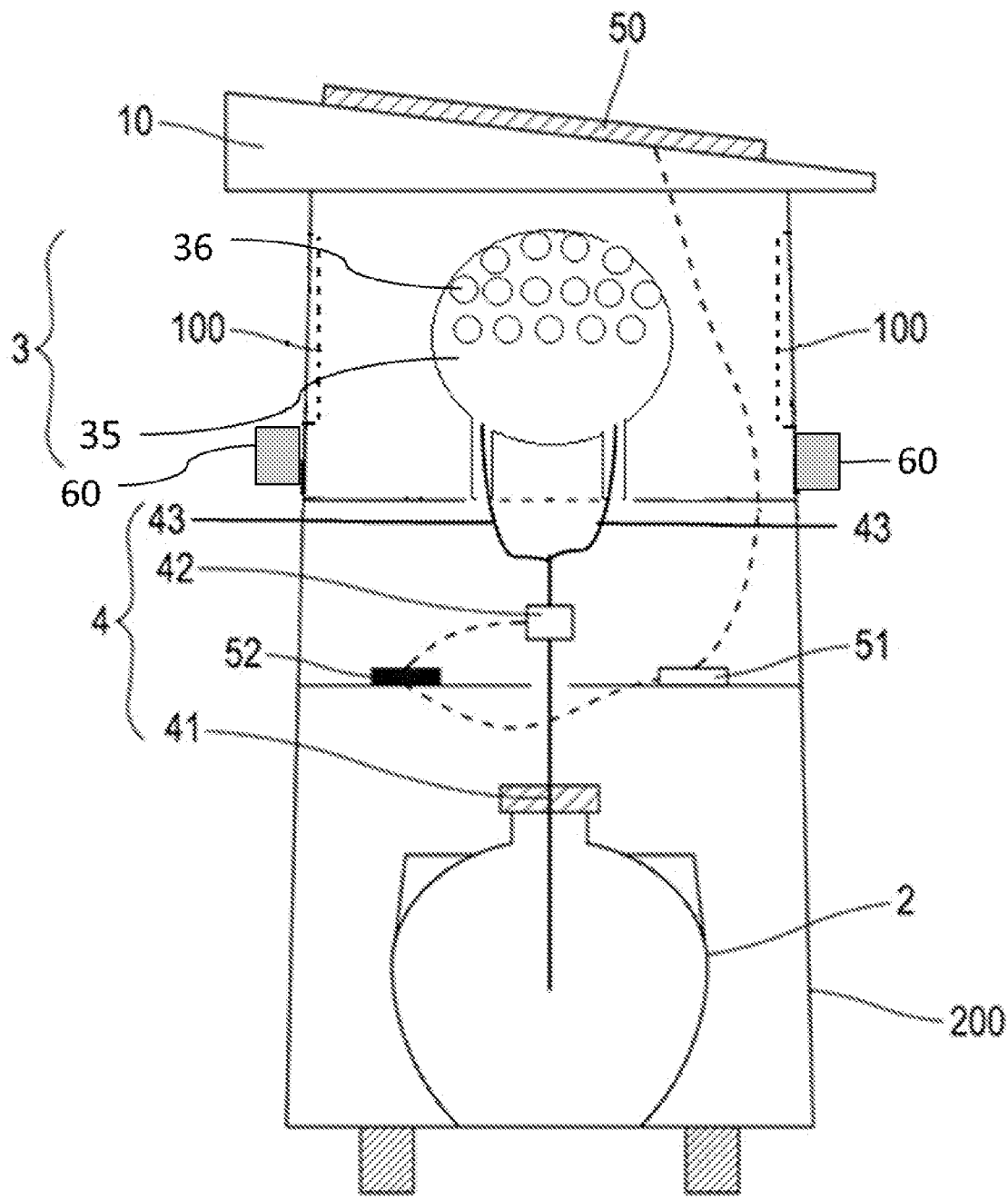

With reference to FIGS. 1, 5 and 6, the installation 1 comprises a tank 2 containing the attractant composition according to the invention. The tank 2 is placed in the bottom part of the installation 1. In a particular embodiment, the tank has a capacity of 20 L.

The installation 1 comprises diffusion means 3 situated in the top part of the installation, above the tank. Advantageously, the placement of the diffusion means 3 in the top part of the installation, which is situated at a height of approximately between 75 cm and 1 m with respect to the ground, makes it possible to capture the flight of *Bactrocera oleae*. Preferably, the diffusion means 3 are situated at the level of the openings 100.

With reference to FIG. 1, the diffusion means 3 comprise four hollow truncated elements with open ends 30, of which only two truncated elements 30 are represented. Each truncated element comprises an orifice of large cross section 31 and an orifice of small cross section 33, the two orifices being separated by a sloping peripheral wall. Each orifice of small cross section 33 is situated inside the installation. Each orifice of large cross section 31 is situated near an opening 100. According to a particular embodiment, the diameter of the orifice of large cross section is substantially equal to the diameter of the opening 100. For example, the orifice of large cross section of the truncated element fits into the opening.

Figure 3:
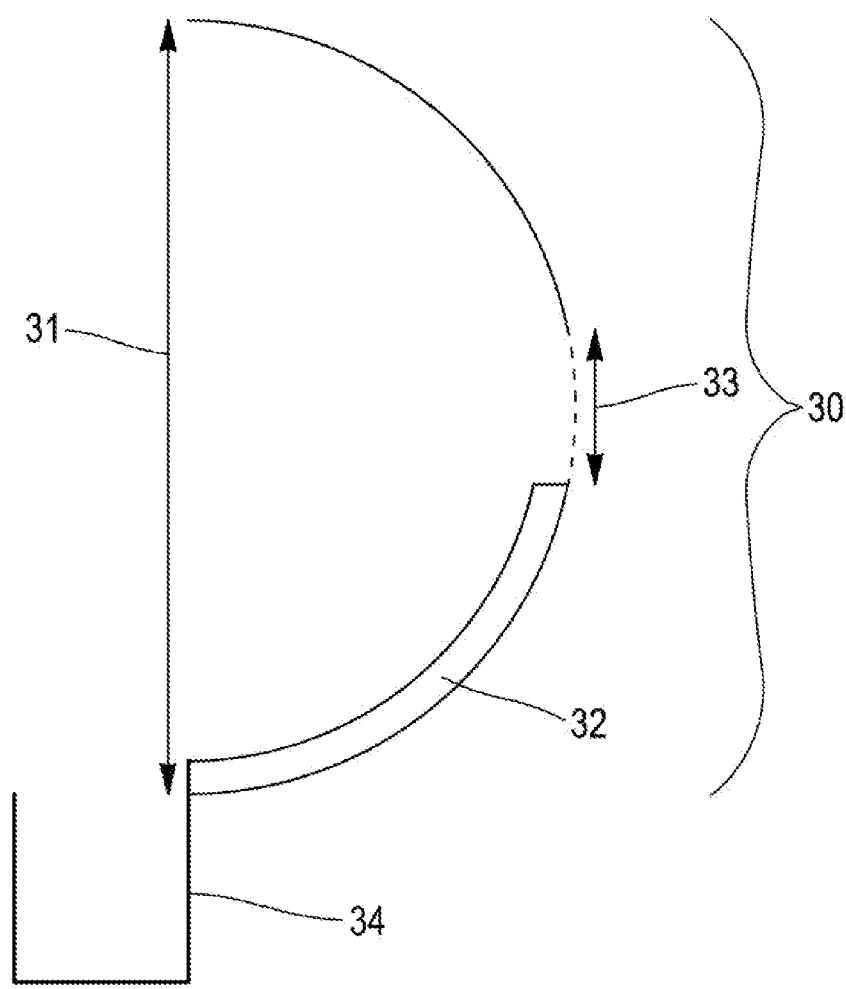
Figure 4:
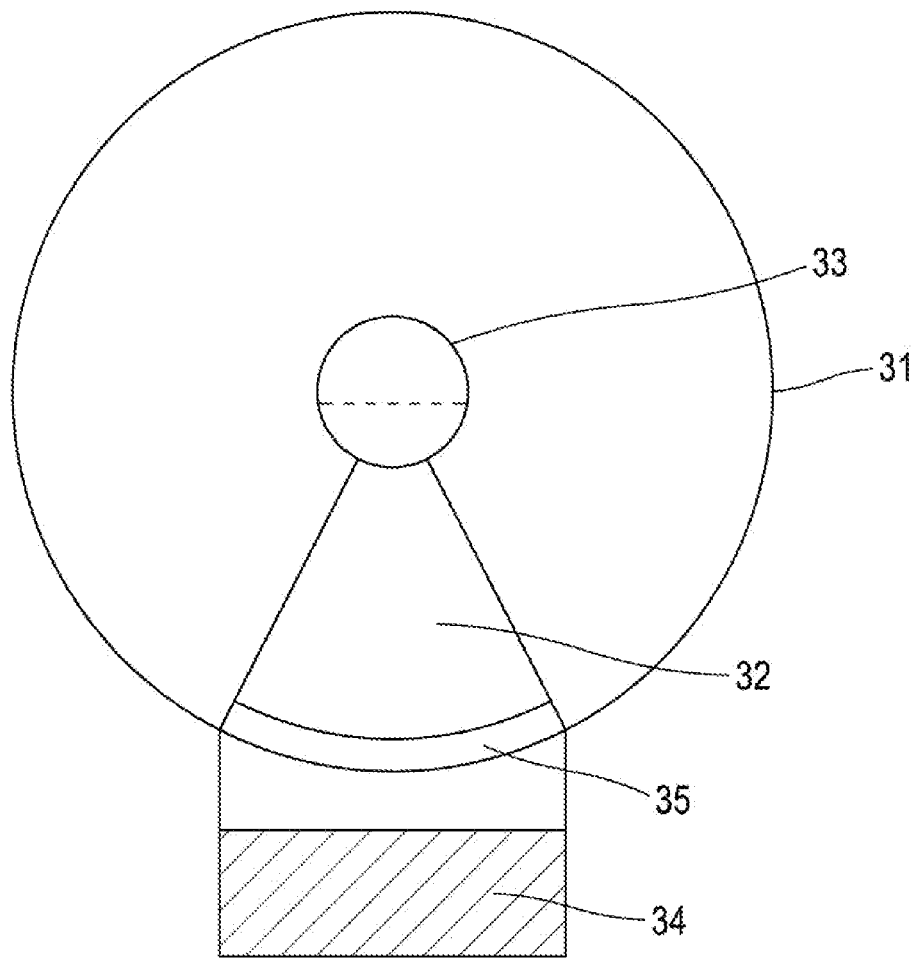

With reference to FIGS. 3 and 4, each hollow truncated element comprises a diffusion basin 32. The diffusion basin 32 corresponds to a groove realized on the inner surface of the peripheral wall of the truncated element. The groove 35 is closed at the level of the orifice of large cross section so as to retain the attractant composition.

With reference to FIG. 1, the diffusion means 3 comprise four receptacles, of which only two receptacles 34 are represented. Each receptacle 34 allows the surplus attractant composition coming from the diffusion basin 32 to be collected. Each receptacle is placed under a hollow truncated element.

According to another embodiment, the diffusion means 3 comprise a diffusion container. With reference to FIGS. 5 and 6, a hollow diffusion sphere 35 having orifices 36 on its surface is represented. With reference to FIGS. 5 and 6, the installation does not comprise a truncated element. The diffusion sphere 35 is arranged and configured to be in alignment with the openings 100, advantageously equidistant from the four openings. The installation comprises supply means 4 allowing the transfer of the attractant composition contained in the tank to the diffusion means. The supply means 4 comprise a first tank pipe 41, a peristaltic pump 42 and four diffusion pipes 43. With reference to FIGS. 1, 5 and 6, there are represented two diffusion pipes 43. The first pipe 41 allows the transfer of the attractant composition from the tank 2 to the inlet of the peristaltic pump 42 and the diffusion pipes 43 allow the transfer of the attractant composition from the outlet of the peristaltic pump 42 to the diffusion means 3. Advantageously, the mouth of each pipe 43 is arranged and configured to allow the attractant composition to flow into a basin 32 of the hollow truncated element or into the diffusion sphere 35.

With reference to FIG. 1, the installation comprises retention means 6 arranged and configured to capture or trap or retain the *Bactrocera oleae*. The retention means are sheets 6 covered with glue. Preferably, the retention means comprise four sheets 6 covered with glue. The retention means are situated in the top part of and inside the installation. Advantageously, the sheets of glue are situated downstream of the hollow truncated elements with open end 30, allowing the *Bactrocera oleae* to be retained, once these latter have entered the installation. Advantageously, the sheet of glue 6 is situated at a distance of from 5 to 10 cm downstream of the hollow truncated element with open end 30.

With reference to FIG. 6, the installation comprises retention means 60 arranged and configured to capture or trap or retain the *Bactrocera oleae*. The retention means are suction devices arranged and placed so as to suck in a flow of surrounding ambient air containing the *Bactrocera oleae* attracted by the attractant composition and comprising a *Bactrocera oleae* trap arranged with the suction device so that the *Bactrocera oleae* sucked in by the device are retained in the trap. Preferably, the retention means comprise four suction devices 60. The retention means are situated in the top part of and outside the installation. Advantageously, the suction devices are situated below the opening 100.

The installation also comprises power supply means arranged and configured to supply the supply means with power and actuate them as well as to supply the suction devices with power. The power supply means comprise an electric motor 52 making it possible to actuate the pump of the supply means. The power supply means also comprise a 12V lead gel battery 51 and a solar panel 50 allowing the electric motor to be supplied with electricity. Advantageously, the solar panel is located on the roof 10 of the installation.

Another aspect of the invention relates to the use of an attractant composition according to the invention for attracting *Bactrocera oleae*. Another aspect of the invention relates to the use of an attractant composition according to the invention for attracting *Bactrocera oleae* and/or controlling *Bactrocera oleae*. Advantageously, the present invention relates to the use of an attractant composition for attracting *Bactrocera oleae* and/or controlling *Bactrocera oleae*, comprising:
- from 0.5% to 50% by weight of active substances as defined previously,
- from 2% to 60% by weight of the at least one oily agent as defined previously,
- from 5% to 50% by weight of the at least one emulsifier as defined previously, and
- from 0.1% to 2% by weight of the at least one preservative as defined previously, the % by weight being expressed with respect to the total weight of the total attractant composition.

FIGURES

FIG. 1: FIG. 1 represents an installation for capturing *Bactrocera oleae* according to an embodiment of the invention, the installation being viewed from the front with partial cutaway allowing the inside of the installation to be shown.

Figure 2:
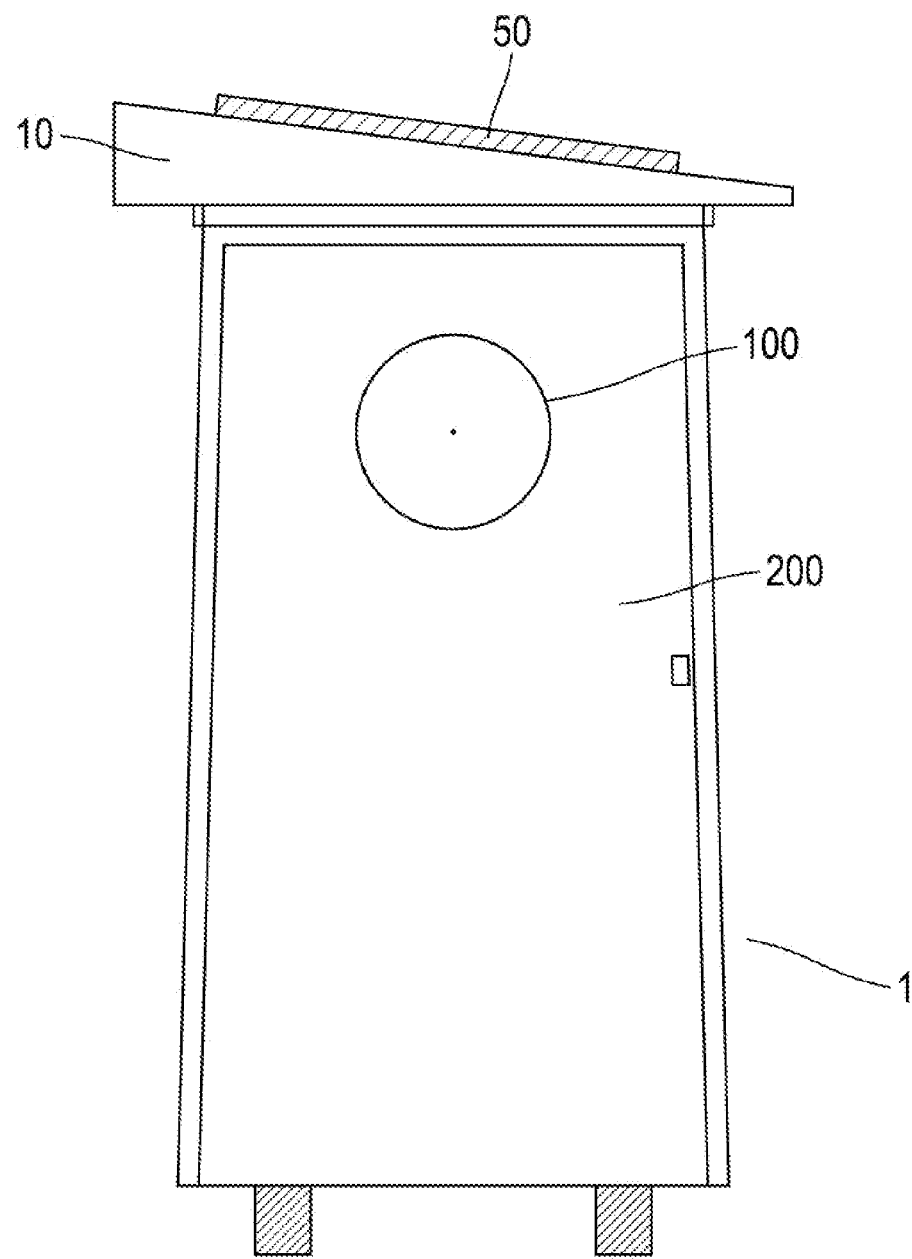

FIG. 2: FIG. 2 represents an installation viewed from the front, in accordance with FIG. 1.

FIG. 3: FIG. 3 represents a side view of the hollow truncated element with open ends.

FIG. 4: FIG. 4 represents a front view of the hollow truncated element with open ends.

FIG. 5: FIG. 5 represents an installation for capturing *Bactrocera oleae* according to another embodiment of the invention, in which the diffusion means comprise a diffusion sphere, the installation being viewed from the front with partial cutaway allowing the inside of the installation to be shown.

FIG. 6: FIG. 6 represents an installation for capturing *Bactrocera oleae* similar to FIG. 5 and also comprising the suction devices, the installation being viewed from the front with partial cutaway allowing the inside of the installation to be shown.

EXAMPLES

Example 1: Evaluation of the Attractiveness of the Active Substances of the Attractant Composition According to the Invention Equipment and Method The attractiveness of the active substances of the attractant composition according to the invention was evaluated using a glass Y-tube olfactometer (internal diameter 4.5 cm; length of the arm 22 cm; length of the main stem 24.5 cm). The assembly was placed in a lit room at 22° C. Screws held the Y-tube in an inclined position (angle of 90° between the Y-tube and the horizontal plane). The Y-tube was placed in the centre of an artificially lit box (60×60×60 cm), covered with sheets on the outside in order to avoid external stimuli. The tubes at the end of the Y were connected to two glass adaptors, to which 30 ml glass flasks were attached, each containing a 1 cm² piece of filter paper. The treatments were diluted in dichloromethane (CARLO ERBA, 100%) on the control side were applied to the pieces of filter paper 2 minutes before the release of the first fly, in order to allow the solvent to evaporate and to keep the odour on the sheet of paper. One sheet of paper is used for 30±10 min. Preliminary analyses showed that the treatment with dichloromethane does not affect the behaviour of the flies. The flow of air was first purified by passing it through washing bottles filled with charcoal granules, then was guided into the flasks containing odour-loaded dichloromethane and pure dichloromethane as control. At the base of the Y-tube, the air was sucked in by means of a diaphragm pump, producing an air flow rate of 100 ml/min in the arms of the Y and in the base tube.

Individual female flies—from 8 to 30 days old—were released one by one into the first cm of the base tube of the olfactometer using a manual aspirator. Activated by the flow of odour-loaded air and motivated by the light, the flies started to go up the tube. The air suction tube was connected to the glass Y-tube and the time until the flies reached the end of one of the arms of the Y was recorded.

Incidentally, if a fly did not make a choice within 7 minutes, this was considered to be a non-choice. Statistically, no choice was dismissed.

One experiment consisted of analyzing 10 flies in the olfactometer. Each experiment was repeated 5 times to generate 50 repetitions. After 5 experiments, all the parts of the installation were cleaned with soap and distilled water and were placed in an oven for 1 hour at 100° C.

In order to evaluate the attractiveness of one molecule vis-à-vis *Bactrocera oleae*, the data collected were analyzed with a khi2 statistical test on Excel and R. The p value, obtained in this test, indicates the probability of obtaining the same value if the null hypothesis was true. In this case, the distribution of *Bactrocera oleae* remains at 50% vs 50% even in the presence of the chemical product as theoretical distribution. If this p value is less than the threshold value defined beforehand (here, 5%), the null hypothesis is rejected and the result of the test is statistically significant, or the compound attracts the olive fruit fly in a significant manner.

Results Obtained

The results obtained are presented in Table 1.

TABLE 1

| Behavioural response obtained in the olive fruit fly | |
|---|---|
| Substances tested | Behavioural response obtained using the substance tested (expressed in %) |
| Olive | 50% |
| Dichloromethane (10 ng) | 51.42% |
| Decanal (10 ng) | 68.00% |
| Beta-caryophyllene (10 ng) | 70.00% |
| Combination (Z)-beta-ocimene and (E)-beta-ocimene (10 ng) | 55.00% |
| Combination (Z)-beta-ocimene and (E)-beta-ocimene (10 ng) + beta-caryophyllene (10 ng) + decanal (10 ng) | 57.50% |
| Attractant composition according to the invention: combination (Z)-beta-ocimene and (E)-beta-ocimene (100 ng) + beta-caryophyllene (100 ng) + decanal (10 ng) | 86.00% |

The results show that the attractant composition according to the invention comprising the combination of (Z)-beta-ocimene and (E)-beta-ocimene (100 ng), beta-caryophyllene (100 ng) and decanal (10 ng) has a greater attractiveness (86%) compared with the use of each of the substances tested individually as well as compared with an olive.

Example 2: Attractant Composition for Attracting Insects of the Species *Bactrocera oleae* According to the Invention The attractant composition for attracting insects of the species *Bactrocera oleae* comprising (Z)-beta-ocimene, (E)-beta-ocimene, beta-caryophyllene and decanal, as the only active substances, and at least one excipient is presented in Table 2 below.

| Ingredients of the composition | Content in % with respect to the total weight of the composition |
|---|---|
| (Z)-beta-ocimene and (E)-beta-ocimene | 8.75% |
| beta-caryophyllene | 21.00% |
| decanal | 5.25% |
| Rapeseed oil | 54.60% |
| Butylated hydroxytoluene | 0.40% |
| Atlox 4916 (polymeric ester) | 5.00% |
| Polysorbate 20 | 5.00% |

The invention claimed is:

1. Attractant composition for attracting insects of the species *Bactrocera oleae* comprising (Z)-beta-ocimene, (E)- beta-ocimene, beta-caryophyllene and decanal, as the only active substances, and at least one excipient.

2. The attractant composition for attracting insects of the species *Bactrocera oleae* according to claim 1, wherein said active substances represent from 20% to 50% by weight of the total weight of the attractant composition.

3. The attractant composition for attracting insects of the species *Bactrocera oleae* according to claim 1, wherein:
   the combination (Z)-beta-ocimene and (E)-beta-ocimene represents between 15% and 40% by weight,
   beta-caryophyllene represents between 40% and 70% by weight, and
   decanal represents between 5.0% and 20% by weight with respect to the total content of active substances of the composition.

4. The attractant composition for attracting insects of the species *Bactrocera oleae* according to claim 3, wherein:
   the combination (Z)-beta-ocimene and (E)-beta-ocimene represents 25% by weight,
   beta-caryophyllene represents 60% by weight, and
   decanal represents 15% by weight with respect to the total content of active substances of the composition.

5. The attractant composition for attracting insects of the species *Bactrocera oleae* according to claim 1, wherein the at least one excipient is selected from the group comprising at least one oily agent, at least one emulsifier, at least one preservative, at least one aqueous agent or a combination thereof.

6. The attractant composition for attracting insects of the species *Bactrocera oleae* according to claim 5, wherein:
   a) the active substances represent from 20% to 50% by weight of the total weight of the total attractant composition,
   b) the at least one oily agent represents from 2.0% to 60% by weight of the total weight of the total attractant composition,
   c) the at least one emulsifier represents from 5.0% to 50% by weight of the total weight of the total attractant composition, and
   d) the at least one preservative represents from 0.1% to 2.0% by weight of the total weight of the total attractant composition.

7. Method for attracting and controlling *Bactrocera oleae*, comprising:
   a) preparing the attractant composition for attracting insects of the species *Bactrocera oleae* according to claim 1, and
   b) presenting an efficacious quantity of the *Bactrocera oleae* attractant composition to said *Bactrocera oleae* for ingestion.

* * * * *